(12) United States Patent
Ferguson et al.

(10) Patent No.: US 10,464,096 B2
(45) Date of Patent: Nov. 5, 2019

(54) ENERGIZED FLUID NOZZLES FOR SPLASH PADS

(71) Applicant: Rain Deck, LLC, Mesa, AZ (US)

(72) Inventors: Walter Brett Ferguson, Queen Creek, AZ (US); Luke Aaron Blais, Ladera Ranch, CA (US); Ryan Dean Vaughn, San Clemente, CA (US); Garrett Sergio Garcia, San Clemente, CA (US); Ryan Werlich, Queen Creek, AZ (US); Jake Clyde Wirthlin, Queen Creek, AZ (US)

(73) Assignee: Rain Deck, LLC, Mesa, AZ (US)

( * ) Notice: Subject to any disclaimer, the term of this patent is extended or adjusted under 35 U.S.C. 154(b) by 244 days.

(21) Appl. No.: 15/424,690

(22) Filed: Feb. 3, 2017

(65) Prior Publication Data
US 2017/0225186 A1     Aug. 10, 2017

Related U.S. Application Data

(60) Provisional application No. 62/291,440, filed on Feb. 4, 2016.

(51) Int. Cl.
*B05B 17/08*    (2006.01)
*B05B 1/18*     (2006.01)
(Continued)

(52) U.S. Cl.
CPC .............. *B05B 17/08* (2013.01); *B05B 1/18* (2013.01); *F03B 13/00* (2013.01); *B05B 15/654* (2018.02);
(Continued)

(58) Field of Classification Search
CPC .......... B05B 17/08; B05B 1/18; B05B 15/654; F03B 13/00
(Continued)

(56) References Cited

U.S. PATENT DOCUMENTS 3,845,291 A * 10/1974 Portyrata ................ F21S 9/046
                                                        362/192
4,616,298 A * 10/1986 Bolson ................... A62C 37/08
                                                        362/96
(Continued)

OTHER PUBLICATIONS

Rain Drop Products LLC, Interactive Water Play, Screen shot of http://web.archive.org/web/20051031032748/www.rain-drop.com/products.aspx; web page archived in Oct. 2005.
(Continued)

*Primary Examiner* — Steven J Ganey
(74) *Attorney, Agent, or Firm* — Knobbe, Martens, Olson & Bear, LLP

(57) ABSTRACT

A nozzle assembly for residential splash pads can include a housing disposed at an interface of the residential splash pad and one or more channels configured to direct a flow of a fluid out of the nozzle assembly and into the residential splash pad. An energy-emitting fixture (such as an LED) can be disposed within the housing and configured to emit energy into the residential splash pad. The nozzle assembly can include a generator and a turbine connected to the generator. The nozzle assembly can further include a flow-diverting mechanism to direct the flow of the fluid to the turbine and increase the velocity of the flow of the fluid at a turbine interface.

28 Claims, 20 Drawing Sheets

(51) Int. Cl.
| | |
|---|---|
| *F03B 13/00* | (2006.01) |
| *F21Y 115/10* | (2016.01) |
| *F21V 31/00* | (2006.01) |
| *F21W 121/02* | (2006.01) |
| *F21Y 115/30* | (2016.01) |
| *F21Y 115/15* | (2016.01) |
| *B05B 15/654* | (2018.01) |

(52) U.S. Cl.
CPC . *F05B 2220/602* (2013.01); *F05B 2220/7066* (2013.01); *F21V 31/005* (2013.01); *F21W 2121/02* (2013.01); *F21Y 2115/10* (2016.08); *F21Y 2115/15* (2016.08); *F21Y 2115/30* (2016.08); *Y02B 10/50* (2013.01)

(58) Field of Classification Search
USPC .......... 239/18, 19, 200, 201, 289, 380–383; 362/96
See application file for complete search history.

(56) References Cited

U.S. PATENT DOCUMENTS

| | | | |
|---|---|---|---|
| 4,920,465 A * | 4/1990 | Sargent ................ | F21S 9/046 239/18 |
| 6,189,556 B1 | 2/2001 | Blake et al. | |
| 6,325,087 B1 | 12/2001 | Tarr | |
| 6,390,447 B1 | 5/2002 | Mosher | |
| 6,539,967 B2 | 4/2003 | Tarr | |
| D495,087 S | 8/2004 | Brown et al. | |
| 2016/0121357 A1 * | 5/2016 | Fossen ................ | F21V 33/006 239/18 |

OTHER PUBLICATIONS

Rain Drop Products, LLC, Interactive Water Play, Screen shot of http://web.archive.org/web/20060320012920/www.rain-drop.com/groupdetail.aspx?group=3; web page archived in Mar. 2006.
Rain Drop Products, LLC, Interactive Water Play, Screen shot of http://web.archive.org/web/20060320013 0410/www.rain-drop.com/productDetail.aspx?id=79 web page archived in Mar. 2006.
Rain Drop Products, LLC, Specification sheet for Skid Mount Equipment Package; document created in Nov. 2005.
Rain Drop Products, LLC, Screen shot of http://web.archive.org/web/20070613070530/http://www.rain-drop.com/; web page archived Jun. 13, 2007.
Rain Drop Products, LLC—CAD drawings of "Omnipod"; document dated Mar. 2006.
Vortex, Screen shot of website depicting operating systems http://web.archive.org/web/20061019225121/www.vortex-intl.com/index . . . ; web page archived in Oct. 2006.
Vortex, Screen shot of website depicting Splash pad samples, http://web.archive.web/20061019230036/www.vortex-intl.com/index . . . ; web page archived in Oct. 2006.
Vortex, Screen shot of website depicting water source options, http://web.archive.org/web/20061019230129/www.vortex-intl.com/index . . . ; web page archived in Oct. 2006.
Waterplay Manufacturing Inc., catalog, www.waterplay.com; document created in Sep. 2005 and available through web page archived in Nov. 2006.
Water Odyssey, Screen shot of website, http://web.archive.org/web/20060203160358/http://waterodyssey.com; web page archived in Feb. 2006.
WETDECK Backyard splash Pads Product Catalog, www.srsmith.com, 2008.
Screenshot of SquirtySquirt.com Splash Pads, Inc. Product page. www.squirtysquirt.com/indexphp?option=com_content&task=view&id=Itemid.., Apr. 30, 2008.
Screenshot of ShopPaddock.com www.shoppaddock.com/squirtysquirt.com/squirtysquirt.html, Apr. 30, 2008.
Led Color Changing Showerhead webpage from Cartsky.com in 2 pages; https://www.cartsky.com/index.php?route=product/product&product_id=23225&language=en&currency=USD.

* cited by examiner

ENERGIZED FLUID NOZZLES FOR SPLASH PADS

CROSS-REFERENCE TO RELATED APPLICATIONS

This application claims the benefit of priority under 35 U.S.C. § 119(e) to U.S. Provisional Application No. 62/291,440, filed on Feb. 4, 2016, titled "APPARATUS, SYSTEMS, AND METHODS FOR ENERGIZED NOZZLES," which is hereby incorporated by reference herein in its entirety.

BACKGROUND

Field

The present disclosure relates generally to systems and methods for energized fluid nozzles, particularly nozzles related to splash pads and play areas.

Description of the Related Art

While some related products exist, there is a need for improved systems and methods of liquid nozzles for splash pads, including nozzles that have energy-emitting devices.

SUMMARY

Details of one or more implementations of the subject matter described in this specification are set forth in the accompanying drawings and the description below. Other features, aspects, and advantages will become apparent from the description, the drawings, and the claims. Neither this summary nor the following detailed description purports to define or limit the scope of the inventive subject matter.

DETAILED DESCRIPTION

Figure 1:
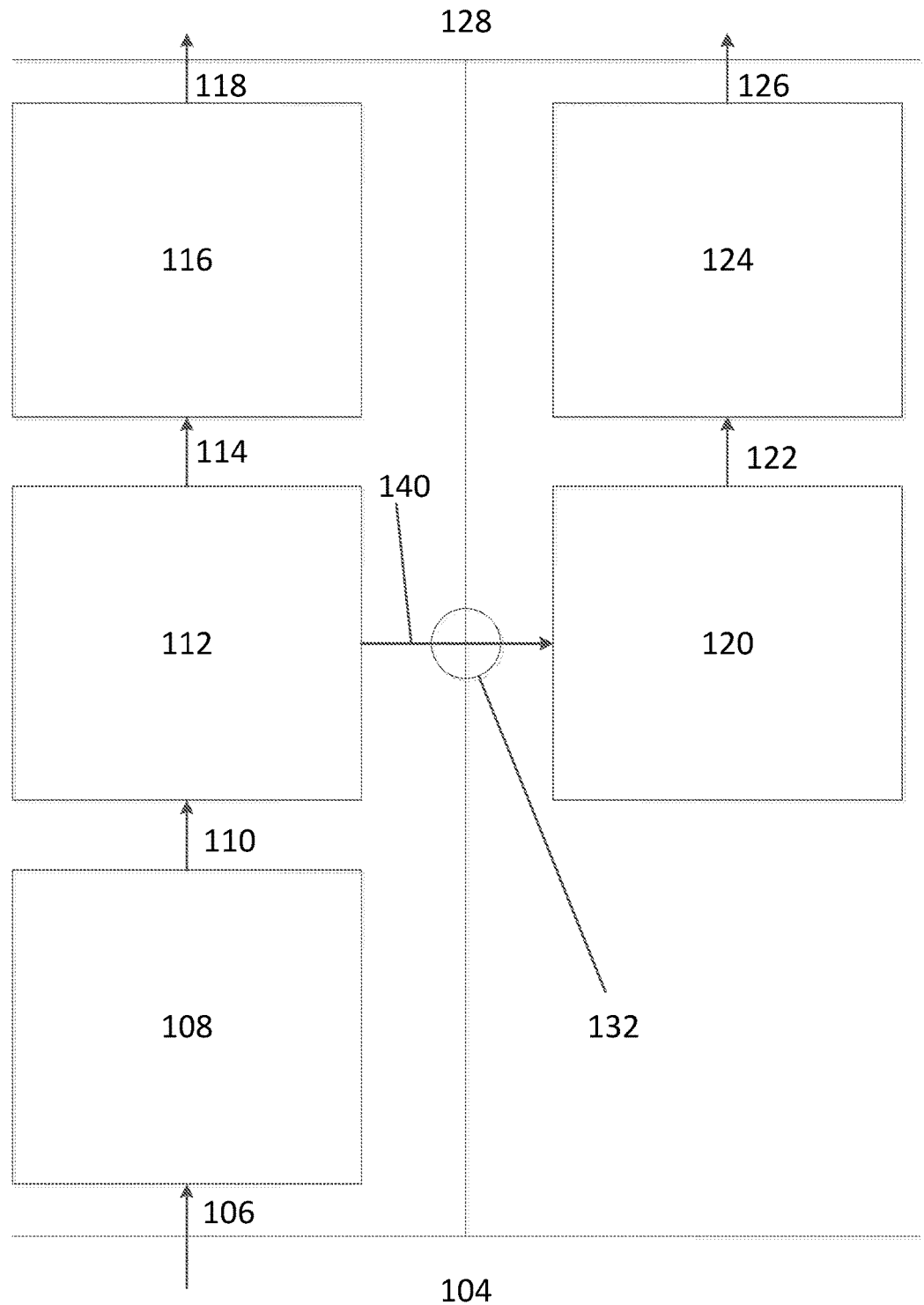
FIG. 1 shows a schematic of some energized fluid nozzles.

Although certain embodiments and examples are disclosed herein, inventive subject matter extends beyond the specifically disclosed embodiments to other alternative embodiments and/or uses and to modification and equivalents thereof. Thus, the scope of the claims appended hereto is not limited by any of the particular embodiments described below. For example, in any method or process disclosed herein, the acts or operations of the method or process may be performed in any suitable sequence and are not necessarily limited to any particular disclosed sequence. Various operations may be described as multiple discrete operations in turn, in a manner that may be helpful in understanding certain embodiments; however, the order of description should not be construed to imply that these operations are order dependent. Additionally, the structures, systems, and/or devices described herein may be embodied as integrated components or as separate components. For purposes of comparing various embodiments, certain aspects and advantages of these embodiments are described. Not necessarily all such aspects or advantages are achieved by any particular embodiment. Thus, for example, various embodiments may be carried out in a manner that achieves or optimizes one advantage or group of advantages as taught herein without necessarily achieving other aspects or advantages as may be taught or suggested herein.

Systems and methods related to certain embodiments disclosed herein are discussed in U.S. Pat. No. 7,980,914, issued on Jul. 19, 2011 and titled "SPLASH PAD KITS," the content of which is in its entirety hereby incorporated by reference.

The disclosed inventions relate to residential and/or commercial splash pads. Splash pad kits and associated nozzles described herein can allow an installer or a direct consumer the ability to purchase all necessary hardware in one unique kit (package or system) to install a splash pad.

The disclosed inventions relate to all splash pads and/or deck jets and associated nozzles (e.g., residential, light commercial, and/or commercial). They relate to installations that create water spouts for pleasure, including both decorative and recreational uses. As used by those in the industry, the term "splash pads" is often used to describe child play areas while the term "deck jets" often refers to installations near pools or Jacuzzis that are typically installed at least partly for aesthetic purposes. However, similar hardware and installation practices can be employed for both splash pads and deck jets and the inventions disclosed herein relate to both. Accordingly, while the terms "splash pad" and "deck jet" may have meanings that do not overlap or do not completely overlap according to industry usage, for simplicity the terms "splash pad" and "splash pads" will be used as a generic term to refer to either "splash pads" or "deck jets" or both. The unique splash pad nozzles described herein can produce, transform, or harness kinetic energy through a system of parts that in turn can produce specific energy that can power, for example, LEDs, speakers, and/or heating elements that are installed within or near a splash pad nozzle. The embodiments described herein may use one or more fluids. As used herein, a fluid may refer to a liquid and/or a gas. While reference may be used to "liquid" or "water," this should not be viewed as limiting the type of fluid that can be used in described embodiment(s).

A splash pad can be an area for play with liquids (e.g., water) that has very minimal or no standing liquid due to a fast-draining design or due to water jets being aimed into a pool so that they do not splash directly onto a deck area. Typically in a splash pad there are inset housings and/or nozzles. A nozzle, such as described herein, can be fixed in the ground with a housing. Nozzles can also be located in above-ground water features such that the water flow is directed out, over, or down into a desired pattern. The nozzle can be configured or designed to have various internal patterns such that when a liquid is forced through and/or along the patterns and/or openings, one or more shapes, sprays, configurations and/or velocities can be produced. For example, various flow paths may be formed within the nozzle.

Along with the various spray configurations available in the various embodiments, a splash pad nozzle can additionally transform kinetic energy into another form of energy (e.g., light, sound, heat) using, for example, an LED panel. In some embodiments, a liquid such as water enters from a supply pipe into the splash pad housing. From the housing, the water may be forced into the nozzle towards the pressure liquid diverter. The pressure liquid diverter directs the liquid to the turbine. The pressure liquid diverter may be shaped in a manner that magnifies the variable pressure created when the liquid is forced from a low-pressure liquid conveyance into a relatively smaller high-pressure liquid conveyance. For example, the pressure liquid diverter may be shaped as a plate. In some embodiments, the pressure liquid diverter directs the liquid against the turbine, thereby causing the turbine to spin. The turbine may be connected to a cylinder magnet, which may have varying phases and polarity, such that rotation of the turbine causes the cylinder magnet to rotate as well while a stator coil remains stationary.

The stator housing may include a light source, for example the LED panel, a generator, a stator coil, and/or a bushing. As the turbine and cylinder magnet assembly rotate around the stator coil, electrical current is generated, which may be used to power, for example, the LED panel. The stator coil may be wired to produce 3-phase power, which allows for a low water flow and corresponding low turbine velocity. This allows the generator to still produce sufficient power for the LED panel.

In some embodiments, for example those embodiments used for the scenario where there is high pressure and high flow, the nozzle can comprise internal circuit protection, which can limit the amount of power delivered to a light source, for example, the LED panel. The internal circuit protection converts the kinetic energy created by the spinning water turbine into electrical power that energizes the LED panel. When the light source, for example the LED panel, is energized, light emanates from the light source.

In order to view the light that emanates from the nozzle, a portion of the nozzle may allow for transmission of light therethrough. For example, a clear plate can be inserted into the top of the nozzle. The clear plate may sit flush with the top portion of the nozzle. This may allow for a seamless play environment that increases the safety and enjoyment of users (e.g., children). For example, having a flush installation can reduce a danger for children to stub their toes or trip over protrusions. The clear plate can be constructed of polycarbonate and may have different spray patterns integrated into the cover, allowing the light and liquid spray to interact in different forms. In some embodiments, the light source includes more than one light fixtures (e.g., LEDs) and may produce multiple colors of light. The various colors may be displayed simultaneously or sequentially. In some embodiments, both the varied spray designs and the light source can be configured to remain active only when water is being forced into the nozzle. In some embodiments, they can remain active at other times or under other circumstances.

Splash Pad Areas and Kits

A splash pad is an area for water play that has very minimal or no standing water. Typically in a splash pad are inset nozzles that spray water upward along with other above-surface water features that release water. The splash pad can have a concrete surface or other materials can be used, such as rubber or other soft surfacing material. The splash pad can be activated using a timer, motion sensor or activation button and the water features can be activated all together or individually. The water for the splash pad can be recycled to a holding tank where it is pulled by a pump, filtered, treated and recycled back through either the water features or returned directly back to the holding tank. A 3-way valve or similar directional valve controls the flow of water through either the water distribution valve or returned back to the holding tank.

A splash pad kit can include several components. Water pump and filter can be used to propel and to clean the water held in a holding tank. If desired a heating element can be added to the system to provide warmed water. The water is fed through a water distribution valve that distributes the water to multiple feed lines which may be individually controlled by ball valves or other similar water restriction valves. The water pressure from the water distribution valve forces the water to the individual splash pad housings/nozzles which spray the water into the air or through the other water features. In some versions, the nozzle is a substantially round disk and is sometimes referred to as a "puck." The water can come forth from the nozzles in many shapes, sprays, configurations and velocities, depending on how the flow path through the nozzle is configured.

The water from a holding tank or swimming pool can also be pumped into an above ground water feature that will release the water in a variety of fashions. The water from these features lands upon the surface of the splash pad that can be coated or covered in a variety of surface material. The following are just some of the surface materials that can be used in the construction of the splash pad finished surface: rubber, acrylic, tile, stamped concrete, colored concrete, raw concrete, pavers, stone slab, asphalt, none-slip materials, thermoplastic rubber, pebble flex. The water flows to one or more drains to ensure minimal or zero standing water upon the splash pad. The one or more drains are placed in the desired area in which water can accumulate and returned to the holding tank to be recycled or back to a swimming pool. The holding tank maintains a level of water that allows for enough volume of water to be forced through each nozzle of the splash pad at one time if necessary. The auto water leveler in the holding tank maintains the necessary capacity of water needed to supply the entire system. The holding tank can be uniquely designed with a grease trap that allows for separation of waste particles found in the recycled water. A chlorine feeder may be used to sanitize the water with chlorine or bromine. An ozonator may also be used to sanitize and/or purify the water. The splash pad plumbing connection material is composed of plastic or metal in a variety of diameters to ensure proper pressure, water flow and stability. The splash pad kit can be activated by using an activation switch (e.g., timer, sensor, etc.) that allows power to the system.

Above-ground water features can be optionally added to a splash pad kit. Such above-ground features can include play structures, periodically tilting water buckets, umbrella-shaped or other whimsically-shaped permanent features that spray, pour, or direct water flow, water tunnels, hose-supports, water slides, etc.

The various types of finishes, or surface materials that can be used on the surface of a splash pad are numerous. The following are examples of surface materials used: rubber, acrylic, tile, stamped concrete, colored concrete, raw concrete, pavers, stone slab, asphalt, none-slip materials, thermoplastic rubber, pebble flex. Some surface materials can be packaged with the splash pad kit.

Water Pump and Filter

In some embodiments, an electronically operated water pump is the main motivator in the recirculation of the water from the splash pad. When in operation the water is continually recycled, pressurized and fed through a filtration system and returned to the splash pad. The pressure-fed filter is usually placed in-line immediately after the water pump. Different types of media are placed within the filter to reduce contaminants in the water. Many different pump and filter configurations can be used in a splash pad kit. The pump and filter can be used as individual units or incorporated into one kit (or skid). The Stand Alone Splash Pad Kit pump and filtering system can be smaller in power and capacity than one used for a standard swimming pool due to the amount of water used in its process.

Water Holding Tank

The water used in a splash pad system can be held in a proprietary designed splash pad holding tank (or reservoir). This tank can be generally configured to meet the volume of water required by the size of the water distribution valve and the number of housing/nozzles used on the splash pad. The holding tank can be manufactured out of a variety of materials such as, but not limited to, fiberglass, plastic or metal. Often the holding tank will be placed below the grade of the splash pad to allow gravity to feed the runoff from the splash pad back to the holding tank via the drain(s). The water is pumped from the holding tank via the water pump and fed through the recycling process back to the splash pad. The water holding tank is generally accessible to allow for the cleaning of debris that may find its way into the tank—this is often done from a lid placed on top of the tank which is secured by a locking mechanism. To ensure that the system maintains a sufficient amount of water needed to supply the splash pad, an auto water leveler can be added to the water holding tank. To increase the sterilization of the water a grease trap (or compartment) is incorporated into a splash pad holding tank.

Auto Water Leveler

The Auto Water Leveler is a device that can be placed in the splash pad holding tank to automatically regulate the amount of water in the holding tank. When the water in the tank drops below the prescribed level, the unit meters in additional water until the proper levels are achieved. If water levels are too high the unit can have a built in overflow that will take out the excess amount of water out of the system.

In some embodiments, a water distribution valve is placed in-line after the water has left the pump and filtering system. With the Automatic Water Distribution Valve, the water is forced through the value to produce a predetermined pulsating pattern at the housing/nozzles based on the configuration within the valve. The configuration is based either on the design of the distribution plate at the opening of the valve lines or controlled by solenoid valves. The distribution valve can either be controlled electronically via a control station or hydraulically. The number of distribution lines helps to determine the number of housings/nozzles used in the splash pad. To ensure the proper pressure to each housing line you must not over extend the capacity of each distribution port from the valve.

Energized Nozzles

Energized nozzles may come in a variety of forms and offer one or more features. For example, an energized nozzle can have a series of chambers configured to accept fluid flow, one or more of which interfaces with one or more energy conversion chambers or devices. The left side of FIG. 1 generally depicts the flow of fluid through various fluid chambers, including intake and emission, while the right side shows the generation, flow, and/or emission of electricity and/or other energy in various electrical chambers. As shown in FIG. 1, fluid flow may begin at a flow source 104. The fluid may move through a flow intake 106 into an inlet chamber 108. The fluid may continue through a path 110 to a drive chamber 112 and ultimately to an outlet chamber 116 through a path 114. From the outlet chamber 116, the fluid can be emitted into the play area 128 through a flow emission 118.

The drive chamber 112 can create and/or generate electricity through an energy transformation means 140. As shown in FIG. 1, this can be done at a fluid-electricity interface 132. As illustrated, electricity can be generated in the electricity generation chamber 120. From the electricity generation chamber 120, electrical energy can flow through an electrical line 122 to an energy emission chamber 124. Energy may be emitted from the energy emission chamber 124 through an energy emission means 126 into the play area 128. The fluid and energy emissions may occur simultaneously or sequentially.

The inlet chamber 108 can take a number of forms. For example, it may include an initial fluid holding volume or it may be an end of the flow intake path 106. The inlet chamber 108 can be useful, for example, for consolidating fluid before the fluid moves into the drive chamber 112. The inlet chamber 108 may also help focus and/or minimize an area through which fluid flows. The chamber 108 may be helpful in increasing the velocity of the fluid flow.

The drive chamber 112 may also be useful for gathering fluid for the creation of electrical energy. The drive chamber 112 may include within it the energy transformation means 140 and/or the fluid-electricity interface 132. The energy transformation means 140 can include one or more mechanical structures for use in generating electricity, such as, for example, an electrostatic generator (e.g., Van de Graaff generator, MHD generator), an electromagnetic inductor (e.g., dynamo, alternator), a turbine (e.g., water, steam, wind), and/or an electrochemical generator (e.g., using osmotic power). Similarly, the fluid-electricity interface 132 may include a wall to generate friction, a turbine blade, and/or an osmotic plate and/or sheet.

Electricity generation chamber 120 can be configured to allow electricity to be generated from the flow of fluid. In some embodiments, the fluid does not enter the electricity generation chamber, for example, to avoid electrical leakage and/or maintain the functionality of the system. The separation may be accomplished, for example, by the use of O-rings, chemical sealant, water-tight packaging, and/or other mechanical barrier between the fluid and electrically charged elements.

The outlet chamber 116 may take on one or more forms. For example, the outlet chamber 116 may include one or more fixed and/or swivel channels. It may also be a final chamber before the fluid enters the one or more fixed and/or swivel channels. The outlet chamber 116 can provide a number of benefits, such as, for example, regulating flow of fluid, normalizing the velocity and/or pressure of the emitted fluid, and/or allowing portions of the fluid to recombine after being separated.

The energy emission chamber 124 can include one or more energy-emitting devices. An energy-emitting device can include, for example, one or more LEDs and/or other light sources, an audio speaker, a heating element, a vibrator, an electrical muscle stimulator, and/or an image capturing device (e.g., camera, motion sensor). These energy-emitting devices can enhance the level of enjoyment of those in the play area 128. For example, LEDs may provide a light show with one or more different colors simultaneous with or sequential to the emission of fluid (e.g., water) to the play area 128. In another example, the energy emission chamber 124 can include a music speaker for playing music and/or other sounds while the fluid is emitted into the play area 128.

Figure 2A:
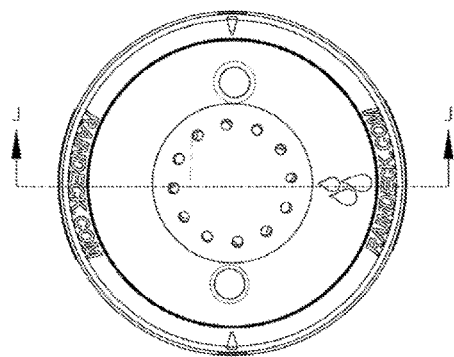
FIG. 2A shows a top view of an energized fluid nozzle for use in a splash pad housing.
Figure 2B:
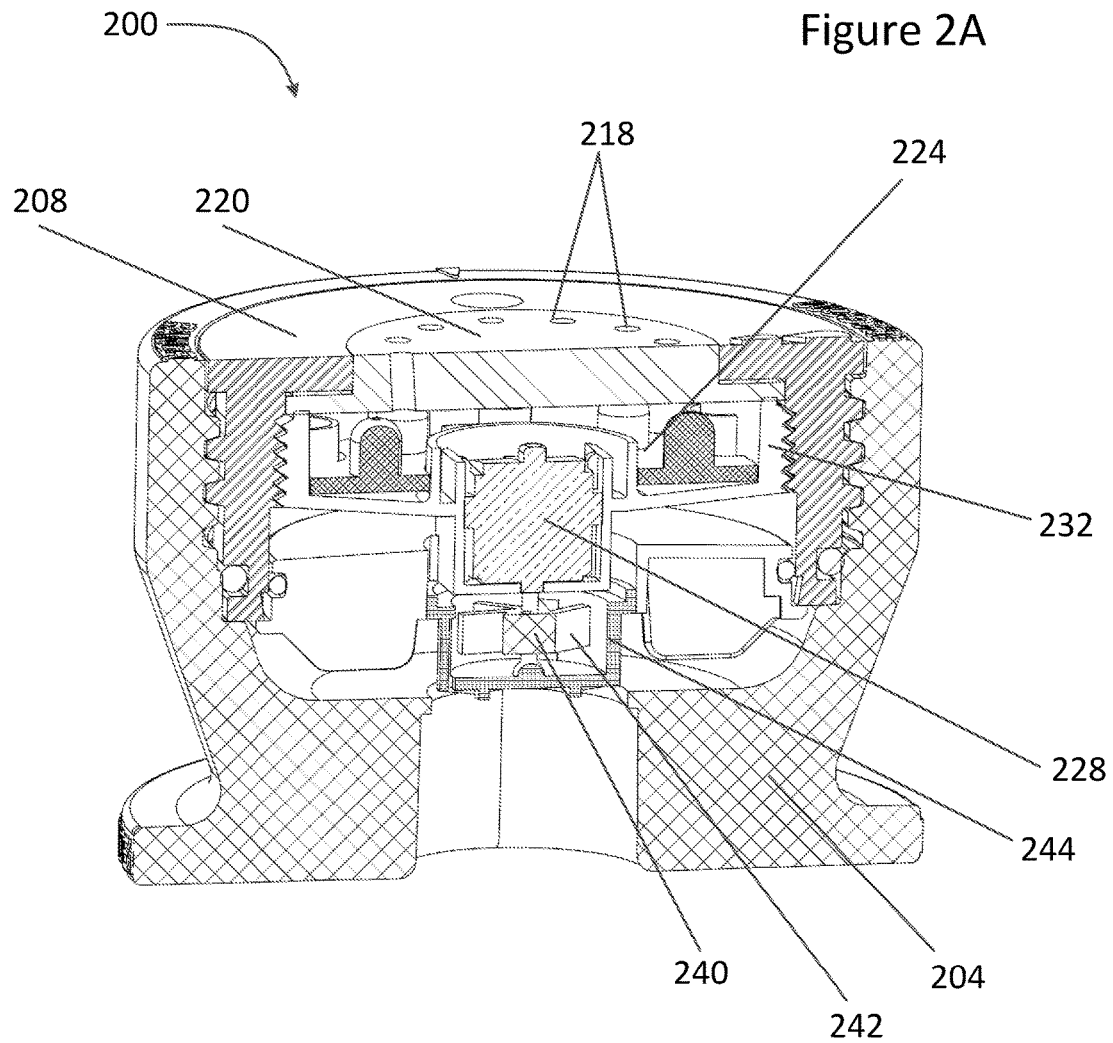
FIG. 2B shows a cross-section of an energized fluid nozzle for use in a splash pad housing.

FIG. 2A shows a top view of an energized fluid nozzle. FIG. 2B shows a cross-sectional view of the energized fluid nozzle in FIG. 2A, the section shown being along the dotted line J-J in FIG. 2A.

The energized fluid nozzle 200 shown in FIG. 2B illustrates an example nozzle described in FIG. 1. As shown, the nozzle 200 includes a nozzle housing 204, a nozzle insert 208, a nozzle plate 220 comprising multiple fixed channels 218, an LED panel 224, an LED housing 232, a generator 228, a fluid flow diverter 244, and a turbine 240. The turbine 240 includes multiple turbine blades 242.

As shown in FIG. 2B, fluid flows from the bottom of the figure through the flow diverter 244. The flow diverter 244 may be referred to as a flow-diverting mechanism. The flow diverter may include one or more openings and may force the fluid flow into a different direction. For example, it may be advantageous to shift an otherwise generally vertical fluid flow into a more horizontal flow in order to engage more effectively with the turbine 240. In some embodiments, the inlets are configured to divert the fluid to flow tangent to the turbine and/or axis of rotation of the turbine. Openings (e.g., inlets) in the flow diverter 244 may be small to facilitate a higher velocity of fluid flow into the turbine area and or minimize the type and/or volume of substances that may enter the nozzle from the splash pad. The flow diverter 244 may include one, two, three, or more inlets. A small number of inlets may increase the velocity of fluid flow into the turbine chamber, thereby increasing the speed with which the turbine rotates. The diameter of the inlets can be adjusted to obtain optimal flow and nozzle pressure. However, a greater number of inlets may be helpful to regulate fluid pressure within the nozzle.

In some embodiments, the flow diverter 244 may use an internal manifold to redirect the water from a vertical flow pattern to horizontal flow pattern. This may allow the turbine to have vertical blades and reduce blow-by from passing water, thereby increasing efficiency (e.g., for low-flow applications). The flow diverter 232 may comprise one or more rigid materials, such as, for example, nylon, plastic (e.g., plastic polymer such as PVC), polycarbonate, wood, and/or metal (e.g., aluminum, copper, steel). In some embodiments, a flow diverter 244 may also be referred to as a pressure fluid diverter.

The turbine 240 can be used as an energy transformation means (see, e.g., FIG. 1) to generate electricity at a fluid-electricity interface (e.g., turbine fins or blades) 242. The turbine may be housed in a turbine chamber (such as a drive chamber of FIG. 1). As shown, the turbine blades 242 can have a rectangular interface. However, other embodiments may have other interfaces. For example, the turbine blades/fins may have a round interface (e.g., circular), an interface that is curve on the edges (e.g., forming a C-shape), an interface that curves in a screw-like (e.g., serpentine) fashion, and/or an interface that takes on yet a different shape altogether.

The turbine blades 242 may freely rotate about the axis of rotation, as shown. However, in some embodiments, the blades are attached to a panel/plate. This may add additional strength/or durability to the fins and/or panel/plate. In some embodiments the panel/plate may include channels and/or holes to allow for fluid to exit the turbine chamber. The panel/plate may be disposed below or above the turbine blades and can be configured to rotate about the axis of rotation. The turbine may comprise one or more rigid materials, such as, for example, nylon, plastic (e.g., plastic polymer such as PVC), polycarbonate, wood, and/or metal (e.g., aluminum, copper, steel).

The generator 228 may include one or more different types of generators, such as for example, a DC electrical generator, an HD generator, an induction generator, a linear electric generator, and/or a variable-speed constant-frequency generator. In some embodiments, the generator 228 can be purchased off-the-shelf and installed in the nozzle assembly. The generator may produce DC or AC current. The generator 228 may include one or more of a dynamo, alternator, solenoid, and/or magnet. The generator 228 may comprise one or more electrically conductive materials, such as, for example, metal (e.g., aluminum, copper, iron, steel), epoxies, and/or organic materials. In some embodiments, particularly where additional electrical power is advantageous (e.g., where flow is low or where power requirements are high), electrical power can be received from outside the nozzle assembly 200 to supplement and/or supplant the energy generated by the generator 228. This may be necessary, for example, when the generator 228 is not able to generate a minimum threshold amount of energy needed to power the one or more energy-emitting devices described herein.

The LED housing 232 can provide support and structure for the LED panel 224 and/or other components of the energized fluid nozzle 200. In some embodiments, the LED housing 232 incorporates all functions of the assembly by integrating all the water channels. The LED housing 232 may include a carriage for the generator 228. This may allow for easy installation of the generator 228 into the nozzle assembly 200. As shown, the LED housing is attached to the nozzle insert 208 using a screw interface. In some embodiments, the LED housing 232 can allow for easy integration with the turbine 240 and/or fluid flow diverter 244 using one or more interfaces, such as, for example, a snap interface, a screw interface, a free rotation interface, and/or any other attachment interface. The LED housing 232 may comprise one or more rigid materials, such as, for example, glass, ABS, nylon, plastic (e.g., plastic polymer such as PVC), polycarbonate, wood, and/or metal (e.g., aluminum, copper, steel). In some embodiments, the LED housing 232 includes one or more fluid seals (e.g., O-rings) and/or gaskets to prevent leakage into other areas of the fluid energized nozzle assembly 200 and/or to control flow of the fluid. For example, a fluid seal may be placed such that fluid must pass through the turbine chamber in order to be expelled from the nozzle assembly 200. The fluid seals and/or gaskets may comprise a flexible material, such as, for example, rubber (e.g., silicone rubber), silicone, and/or plastic. Such fluid seals and/or gaskets may be applied throughout the nozzle assembly 200 as needed.

The nozzle plate 220 may be optically translucent or transparent. It may be referred to as optically clear. For example the nozzle plate 220 may have an optical transmittance greater than a threshold value. In some embodiments, the threshold value is 0.30. In some embodiments, the threshold value is 0.50. In some embodiments, the threshold value is 0.75. In some embodiments, the threshold value is 0.90. The optical transmittance of the nozzle plate 220 may be in an acceptable range. An acceptable range may be, for example, between about 0.30 and 0.99. The acceptable range may be between about 0.50 and 0.95. In certain embodiments, the acceptable range is between about 0.75 and 0.93. As used herein, the terms "clear," "optically translucent," or "optically transparent" may refer to one or more of the ranges above and/or the optical transmittances above. In certain embodiments, the nozzle plate 220 comprises an energy magnifier (e.g., magnifying glass) to direct and/or magnify the emitted energy (e.g., light). In some embodiments, the nozzle plate 220 is tinted with color and/or speckled to add a special effect for the splash pad.

The nozzle plate 220 may comprise a surface that is substantially flat. The surface of the plate 220 may define a nozzle axis that is transverse (e.g., that crosses at an orthogonal, obtuse, acute, or skewed angle) to the surface. In some embodiments, the nozzle axis is parallel to the axis of rotation of the turbine (e.g., the turbine axis for the generator axis), but in some embodiments these two axes are transverse relative to each other. The nozzle plate may include one or more channels (e.g., holes, tubes, pipes, other hollow enclosures) to allow the fluid to exit the fluid nozzle assembly 200. The channels may be fixed and/or dynamic (e.g., swivel, hinged, rotatable). As illustrated in FIG. 2B, the nozzle 200 includes a plurality of fixed channels (e.g., holes). In some embodiments having two or more channels, at least two of the channels are parallel to each other. The channels may be oriented in one or more different orientations and/or at one or more different angles from the nozzle axis. The nozzle plate may be disposed at an interface of a play area (e.g., residential splash pad). Thus, the plate 220 may direct flow of fluid into the play area.

The nozzle plate 220 may be a separate insert from the nozzle insert 208, while in some embodiments the two are integrally formed or otherwise manufactured as different portions of a single unit. In embodiments where the two are separate pieces, the nozzle insert 208 may define an opening or hole into which the nozzle plate 220 can be fitted and/or inserted. The nozzle plate 220 may be fitted into the opening using an adhesive (e.g., glue, sealant, solder, weld, epoxy), physical securing means (e.g., nail, screw, bolt), a screw interface, and/or a snap interface. In some embodiments, the nozzle plate 220 is secured in place through tightening of the LED housing 232, as shown in FIG. 2B. A gasket may be placed between a part of the nozzle plate 220 and the nozzle insert 208. The gasket may help create a seal to prevent fluid from leaking out of the nozzle assembly 200 without flowing through the one or more channels 218. The gasket may also provide additional structural support to prevent the nozzle plate 220 from sliding, rotating, and/or otherwise moving. The gasket may comprise one or more flexible materials, such as, for example, rubber (e.g., silicone rubber), silicone, and/or plastic.

One or more energy-emitting devices, such as one or more LEDs (e.g., on an LED panel 224), may be disposed between the nozzle plate 220 and the LED housing 232. As shown in FIG. 2B, the LED panel comprises multiple LEDs arranged in a spaced formation (e.g., in a circle and/or at regular intervals from one another) such that the LEDs do not physically cover the full LED panel 224. The energy-emitting device may include one or more structures, such as, for example, LEDs and/or other light emitting devices, audio speakers, heating elements, and/or other device. The term "energy-emitting" is used loosely and may refer to other devices that run on electricity, such as a vibrator, muscle shock device, fog generator ("fog machine") or fog generator apparatus, camera, or other electrical device. If the device includes a heating element, the element may be used to heat the fluid before it exits the nozzle assembly 200. If the energy-emitting device includes a light-emitting device (e.g., LED, OLED, fluorescent bulb, strobe light, "black" light, laser), then one or more colors may be displayed by the device (e.g., simultaneously and/or sequentially). In some embodiments, the energy emitting device may be placed on a panel/plate, as shown in FIG. 2B. The placement of the device on the panel may add structural support and/or provide a reliable direction of the energy emission. The panel/plate may comprise any rigid material, such as those used in circuit boards. In some embodiments, the panel/board comprises electrical wiring to allow electricity to pass from the generator 228 to the energy-emitting device.

The direction in which the energy (e.g., light) is emitted may be fixed or it may be dynamic. As shown in FIG. 2B, for example, the LEDs are fixed. However, the one or more energy-emitting devices may be allowed to translate, rotate, and/or swivel along any axis to create a dynamic effect. In some implementations, at least some of the energy is emitted in a parallel axis with at least some of the fluid emission.

In some embodiments, the one or more energy-emitting devices may be coded with one or more water-resistant or waterproofing materials, such as, for example, plastic, rubber, PVC, polyurethane, silicone elastomer, fluoropolymers, and/or wax. These materials may be used on or near one or more energy-emitting devices, and they may also be used elsewhere in the nozzle assembly 200 to prevent the contact of water with electrically charged elements.

The nozzle housing 204 can provide structure for the nozzle assembly 200 and/or protect the components housed within. The nozzle housing may provide an interface for the nozzle assembly 200, the play area (e.g., splash pad or deck jet), and/or fluidic elements (e.g., pipes, tubes, pumps, reservoirs, flow source) that may be disposed elsewhere (e.g., below the nozzle assembly 200). The nozzle insert 208 may be inserted into the nozzle housing 204. This may be achieved using, for example, a snap apparatus, an adhesive, physical attachment devices (e.g., nails, screws), and/or a screw interface (e.g., as shown in FIG. 2B). The nozzle housing 204 may comprise one or more rigid materials, such as, for example, nylon, plastic (e.g., plastic polymer such as PVC), polycarbonate, wood, and/or metal (e.g., aluminum, copper, steel).

The nozzle housing 204 may be placed at an interface of the play area (e.g., residential or commercial splash pad). This can allow the emission of light and fluid to be enjoyed by those on the play area or nearby. While the terms "play area" and "splash pad" have implied that the nozzles may emit the fluid and/or energy upward (e.g., vertically), it should be clear that the nozzles may also emit the fluid and/or energy downward, horizontally, or at any angle. Moreover, while some embodiments include nozzles that are fixed in the ground, other embodiments allow for the nozzles to be attached, for example, to a hose or other device. In such embodiments, the nozzle can be hand-held, inserted into a dynamic nozzle fitting, and/or left to hang freely.

Figure 3:
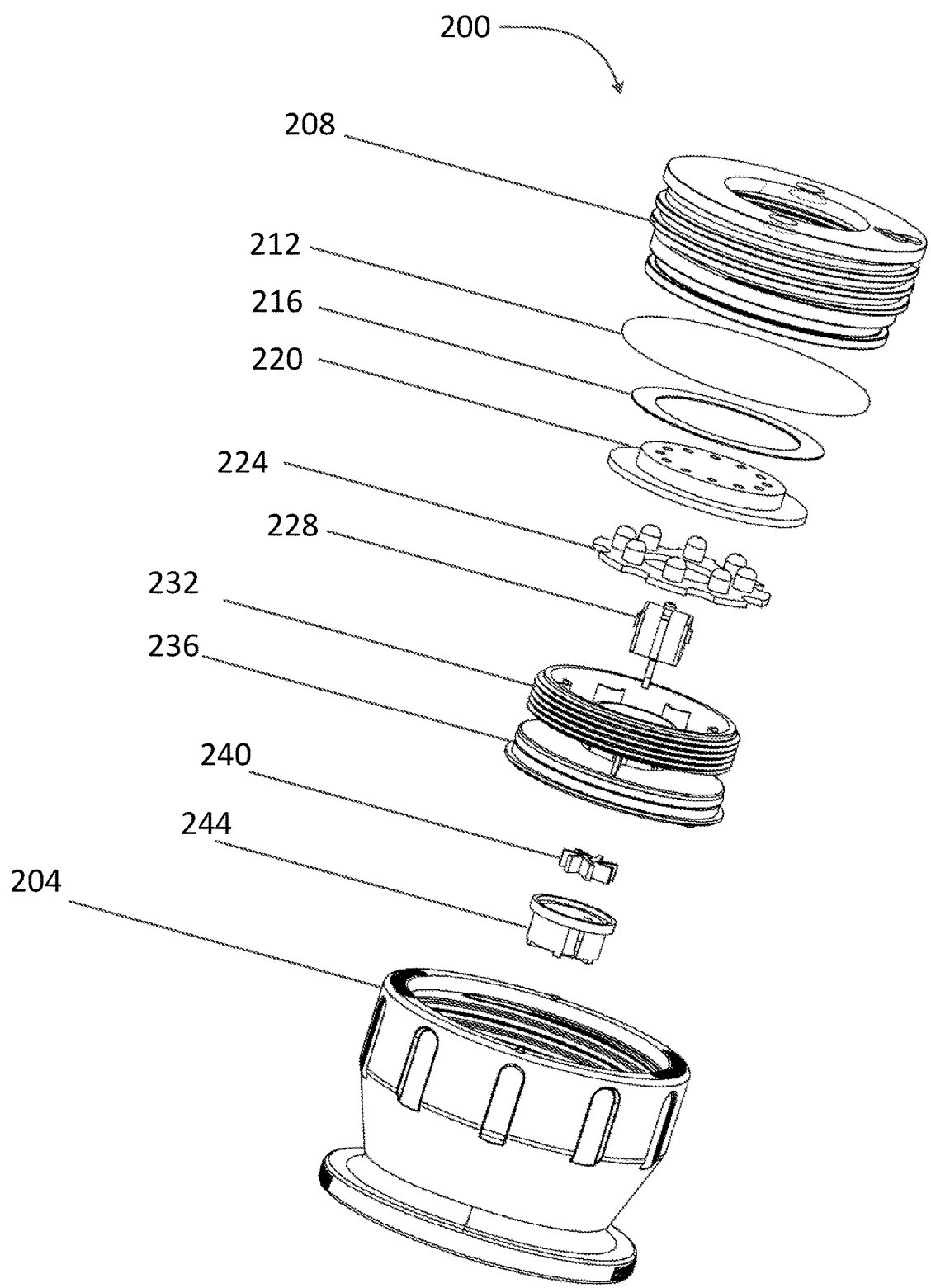
FIG. 3 shows an exploded view of an energized fluid nozzle for use in a splash pad housing.

FIG. 3 shows an exploded view of the nozzle assembly 200. FIG. 3 illustrates some example locations of O-rings 212, 236 as well as a gasket 216. Details for the O-rings and gasket(s) are available in the descriptions above and elsewhere herein for such structures.

Figure 4:
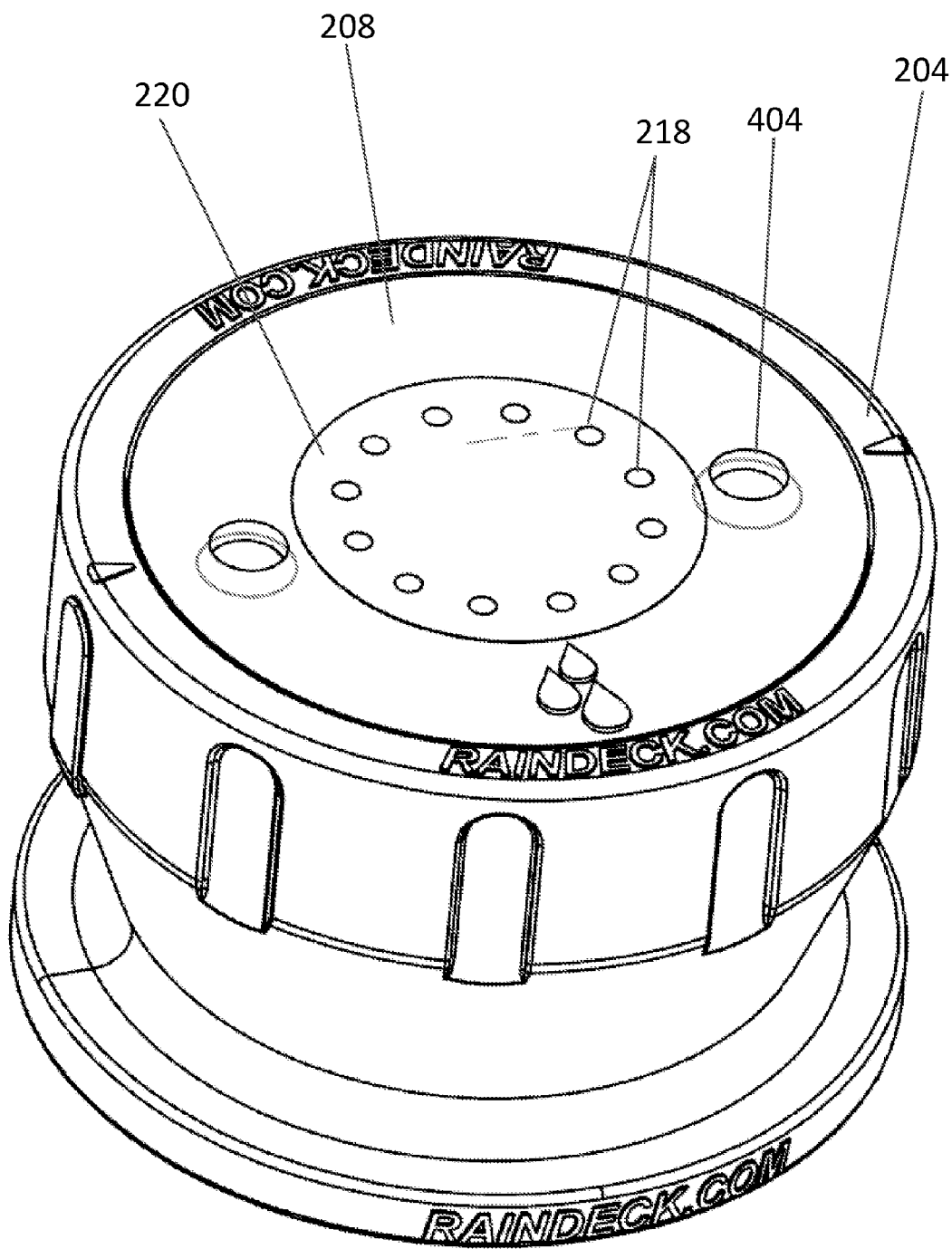
FIG. 4 shows a top perspective view of an energized fluid nozzle.

FIG. 4 shows a top perspective view of an energized fluid nozzle. As shown, the fluid nozzle assembly 200 may include one or more spanner holes 404 to allow for easy disassembly of the assembled nozzle 200. The spanner holes may be referred to as, for example, a pig nose, drilled head, pins, and/or twin hole.

Figure 5:
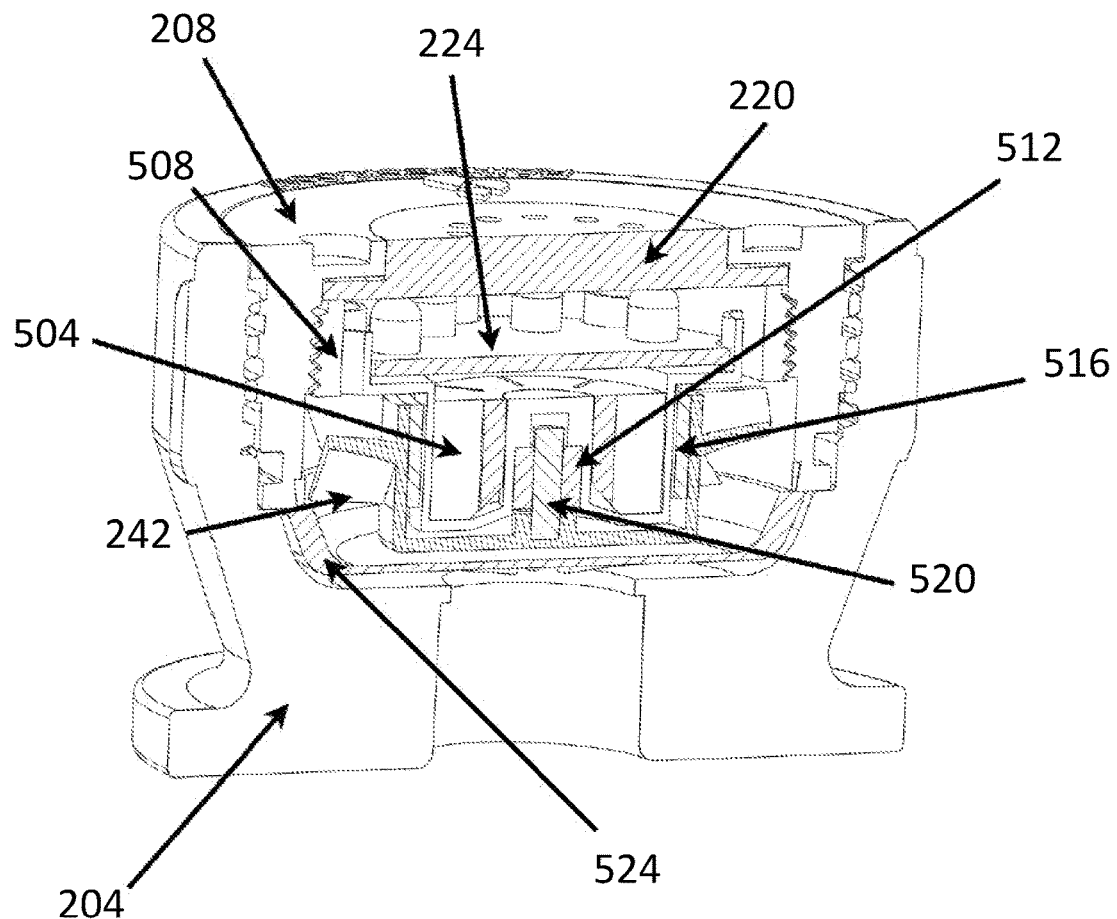
FIG. 5 shows a cross-section of an energized fluid nozzle.

FIG. 5 shows a cross-section of an energized fluid nozzle. Many of the components described above are included in the embodiment shown in FIG. 5. FIG. 5 illustrates an embodiment with a pressure fluid diverter 524, a generator 520, a cylinder magnet 516, a bushing 512, a stator housing 508, and the stator coil 504. As illustrated, the turbine is larger than the turbine illustrated in FIG. 2B. Similarly, the turbine blades 242 are also larger. These differences allow for the stator coil 504 and cylinder magnet 516 to fit within the turbine. As the fluid pushes the blades 242 of the turbine, the cylinder magnet 516 also rotates around the stator coil 504. This creates an electrical current in the generator 520. Electricity generated can power the energy-emitting devices (as illustrated, LEDs) on the LED plate. The bushing 512 prevents electrical communication between the state or housing 504 and the generator 520. The bushing may comprise an electrically insulating material, such as, for example, porcelain, wood, resin, rubber, plastic, glass, and/or composite materials. The stator coil 504 may comprise any electrically conductive material, such as, for example, copper, aluminum, or iron.

The pressure fluid diverter 524 may include one or more openings and may force the fluid flow into a different direction, velocity, and/or flow area relative to that with which the fluid arrived. For example, it may be advantageous to shift and otherwise generally vertical fluid flow into a more horizontal flow in order to engage more effectively with the turbine. Openings (e.g., inlets) in the pressure fluid diverter 524 may comprise a plate/sheet to prevent the flow of fluid into the components without passing through the inlets. The inlets may be small to facilitate a higher velocity of fluid flow into the turbine area. The flow diverter may include one, two, three, or more inlets. A fewer number of inlets may increase the velocity of fluid flow into the turbine chamber, thereby increasing the speed with which the turbine rotates. The diameter of the inlets can be adjusted to obtain optimal flow and nozzle pressure. The pressure fluid diverter 524 may be referred to as a flow-diverting mechanism.

Figure 6:
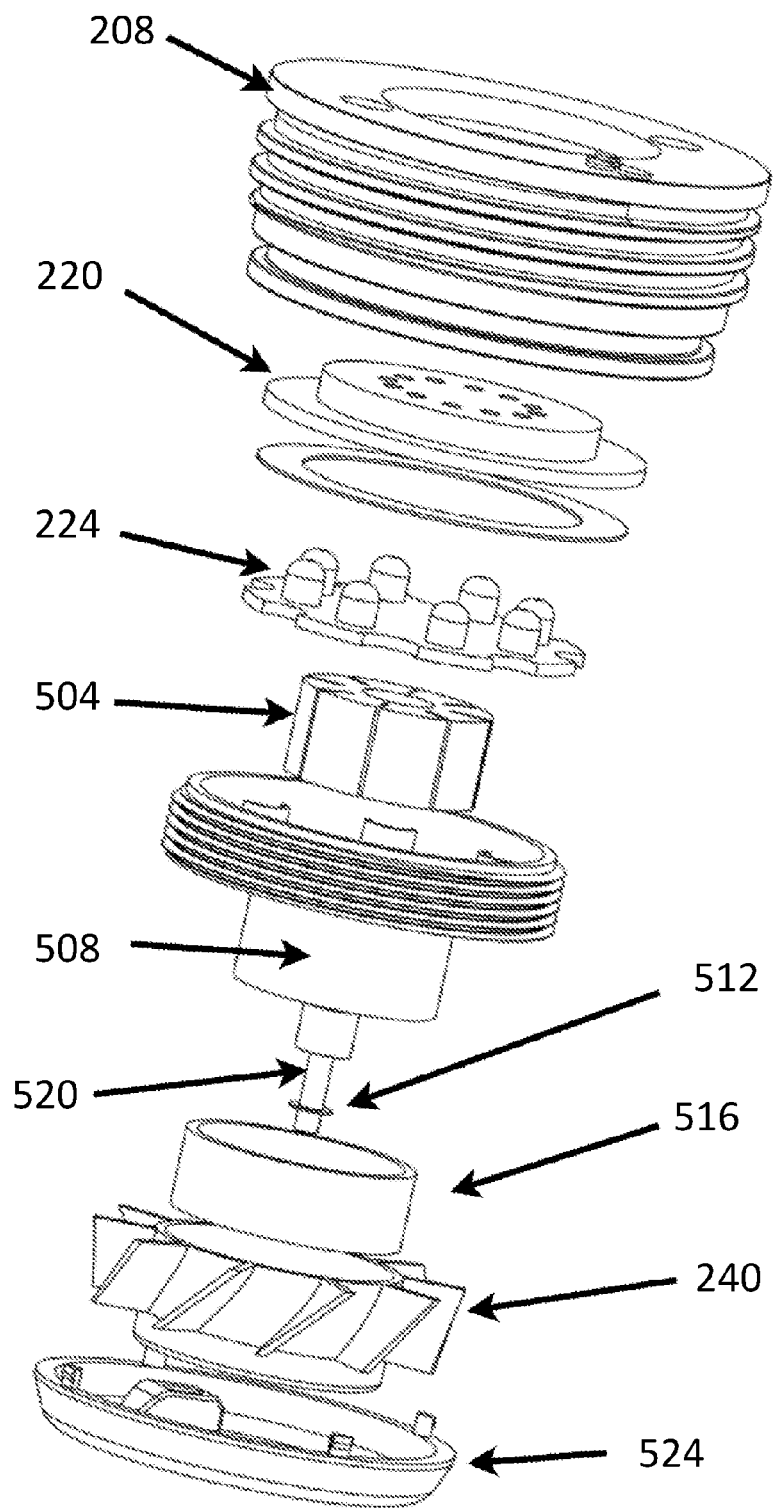
FIG. 6 shows an exploded view of an energized fluid nozzle.

In some embodiments, the pressure fluid diverter 524 may use an internal manifold to redirect the water from a vertical flow pattern to horizontal flow pattern. This may allow the turbine to have vertical blades and reduce blow-by from passing water, thereby increasing efficiency for low-flow applications. The pressure fluid diverter 524 may comprise one or more rigid materials, such as, for example, nylon, plastic (e.g., plastic polymer such as PVC), polycarbonate, wood, and/or metal (e.g., aluminum, copper, steel). FIG. 6 shows an exploded view of an energized fluid nozzle as described above.

Figure 7:
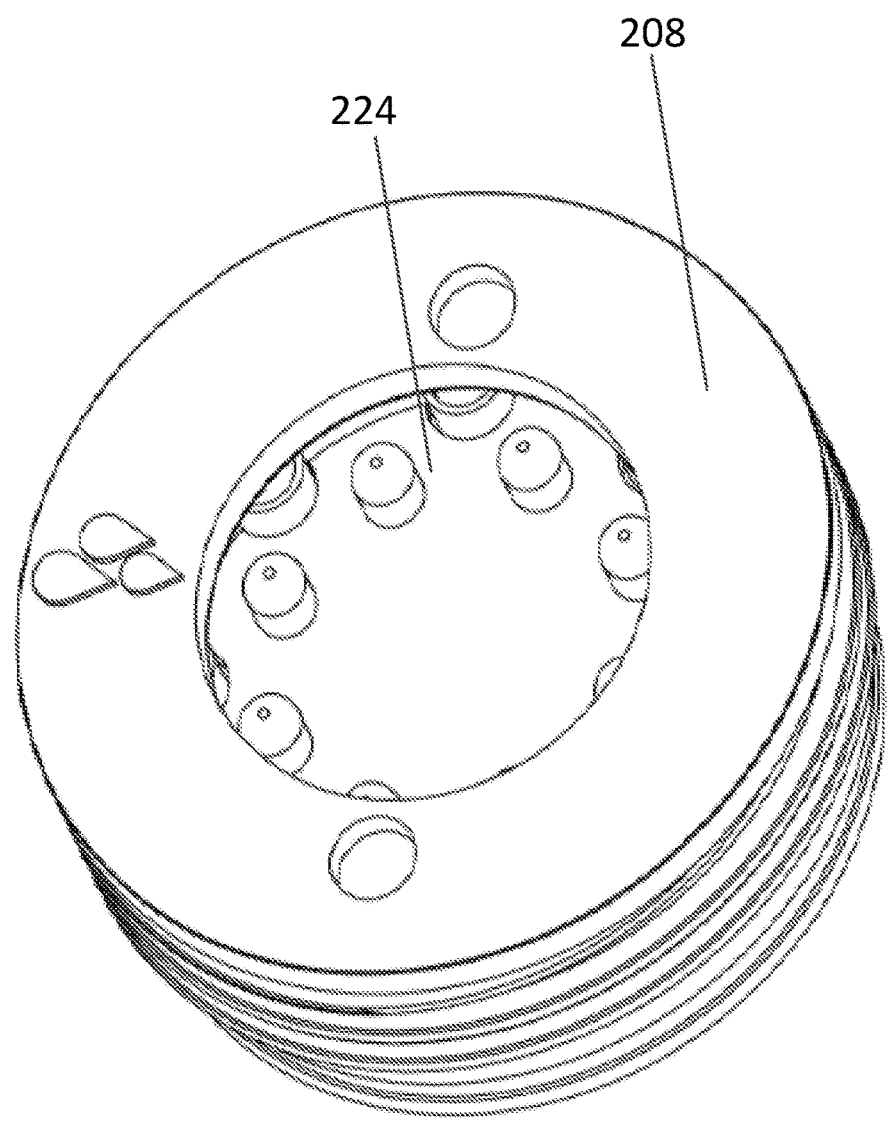
FIG. 7 shows a top perspective view of an energized fluid nozzle.

FIG. 7 shows a top perspective view of an energized fluid nozzle. As shown, the nozzle plate (not labeled) is clear and allows the view of the LED panel 224 underneath.

Figure 8:
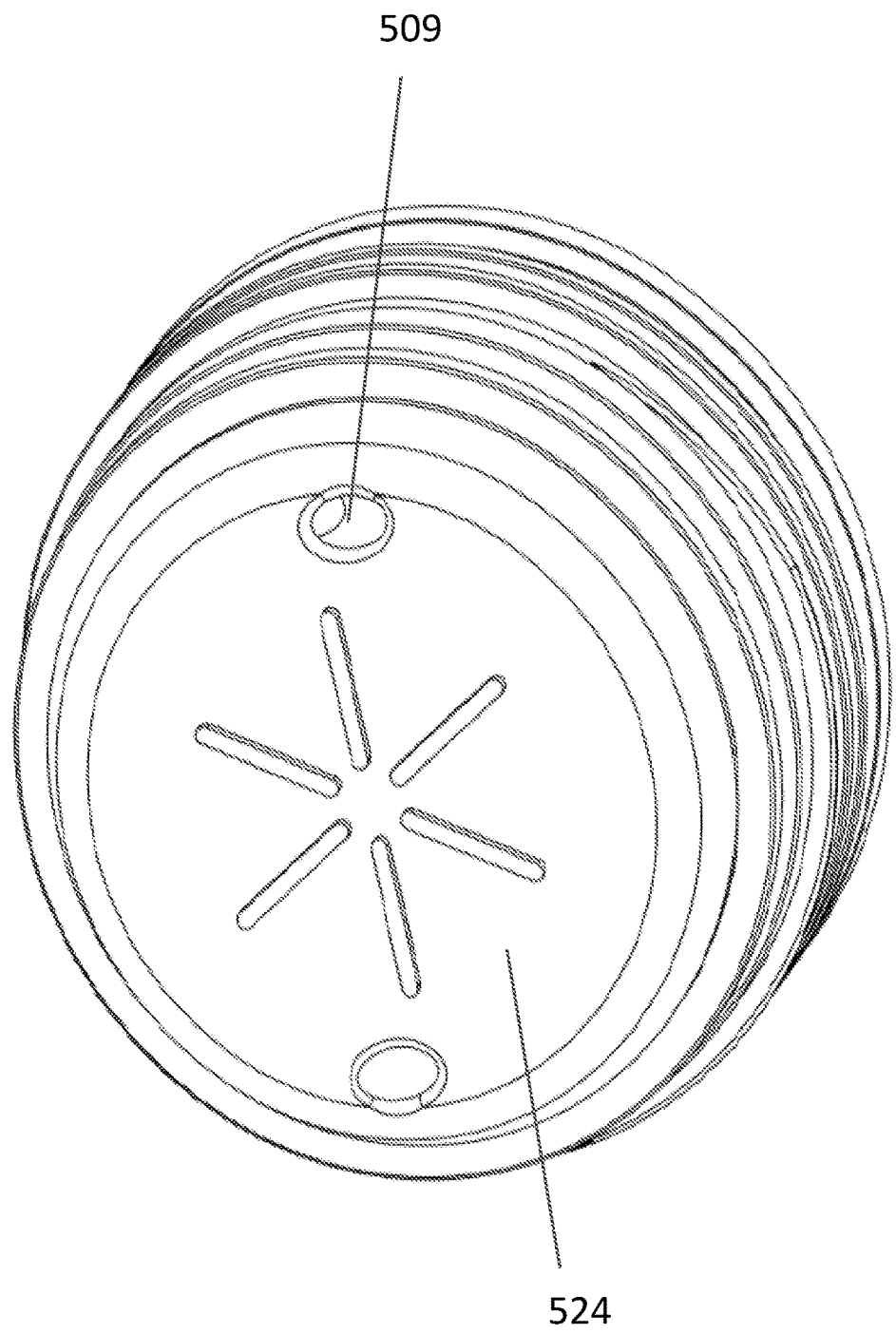
FIG. 8 shows a bottom perspective view of an energized fluid nozzle.

FIG. 8 shows a bottom perspective view of an energized fluid nozzle. As shown, the pressure fluid diverter 524 includes two inlets 509 to allow fluid to enter the nozzle assembly. The inlets may change the direction of the flow of the fluid and/or change the velocity of the fluid flow through the inlets.

Figure 9:
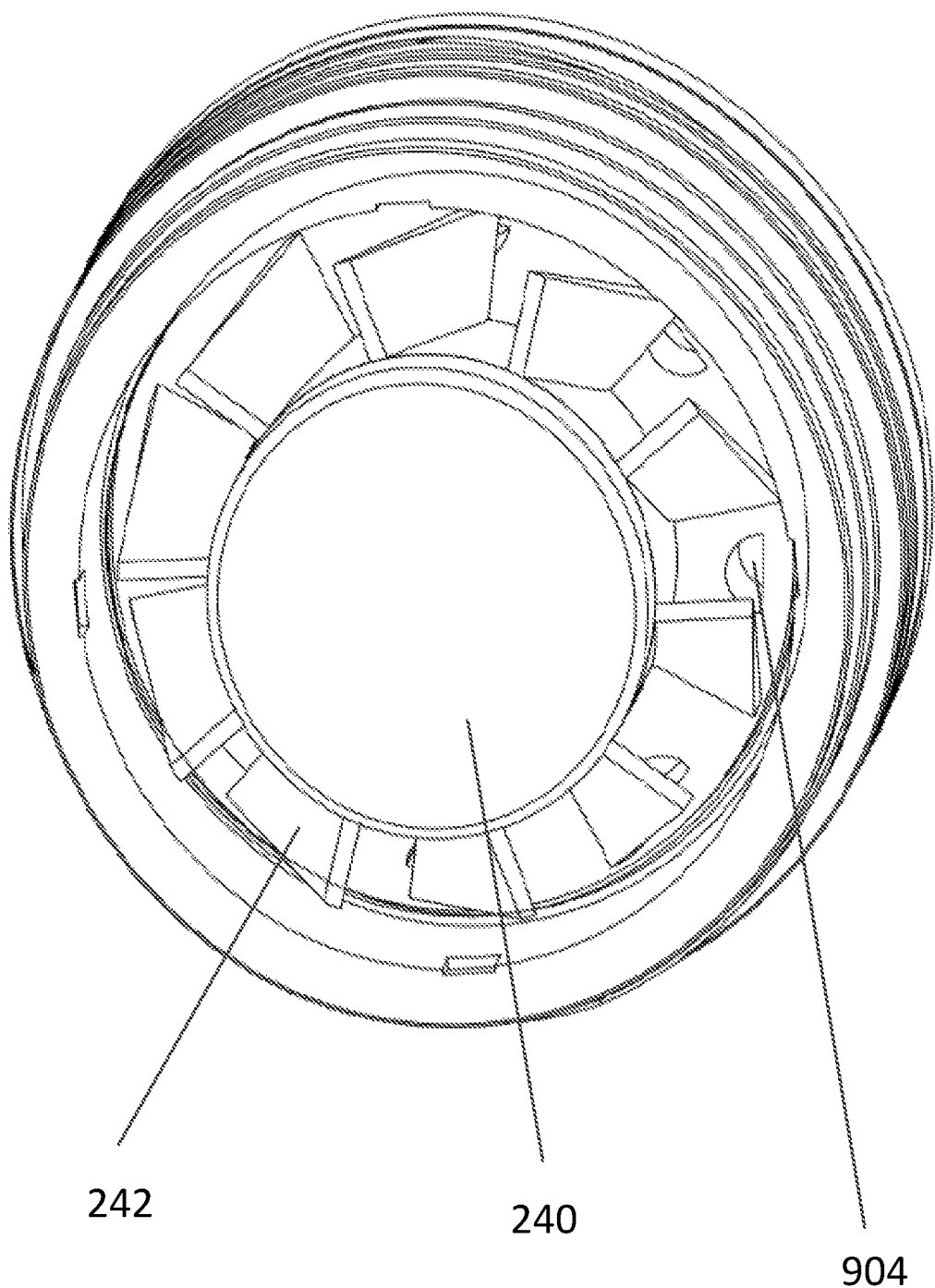
FIG. 9 shows a bottom perspective view of nozzle including a turbine.

FIG. 9 shows a bottom perspective view of a nozzle assembly without a pressure fluid diverter 524. The turbine 240 with the attached blades 242 are illustrated. As shown, the blades have a rectangular interface, and the interface of each blade defines a plane that is transverse to a plane created by the interface of each neighboring blade 242. FIG. 9 also shows a plurality of turbine chamber outlets 904. Once the fluid passes through and/or engages with the turbine 240, the fluid can exit to an outlet chamber (e.g., outlet chamber 116 of FIG. 1). The outlets 904 are part of the turbine assembly in some embodiments. Thus, the outlets may be machined into a turbine plate to which the turbine blades 242 are attached. In such embodiments, the outlets 904 would rotate at the same rotational velocity as the turbine blades 242. In other embodiments, the turbine blades 242 are not attached to the assembly element into which the outlets data for our machined. In such embodiments, the turbine blades 242 rotate relative to the outlets 904.

Figure 10A:
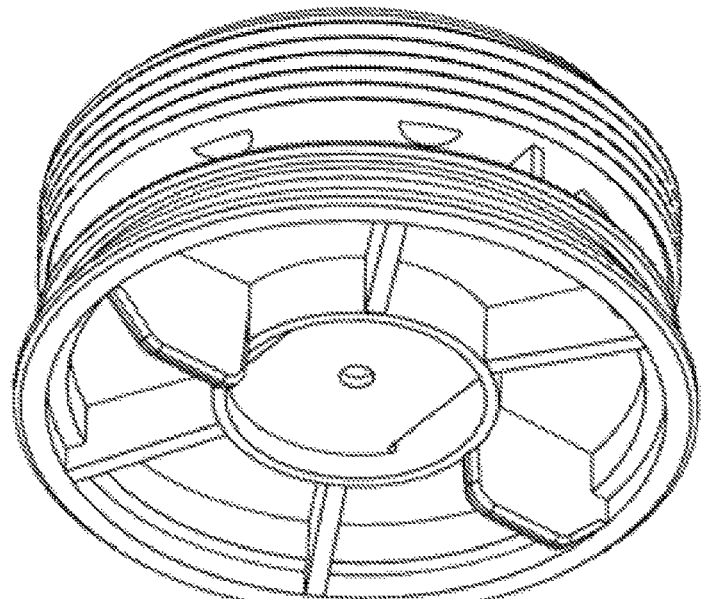
FIG. 10A shows a bottom perspective view of an energy-emitting device housing.
Figure 10B:
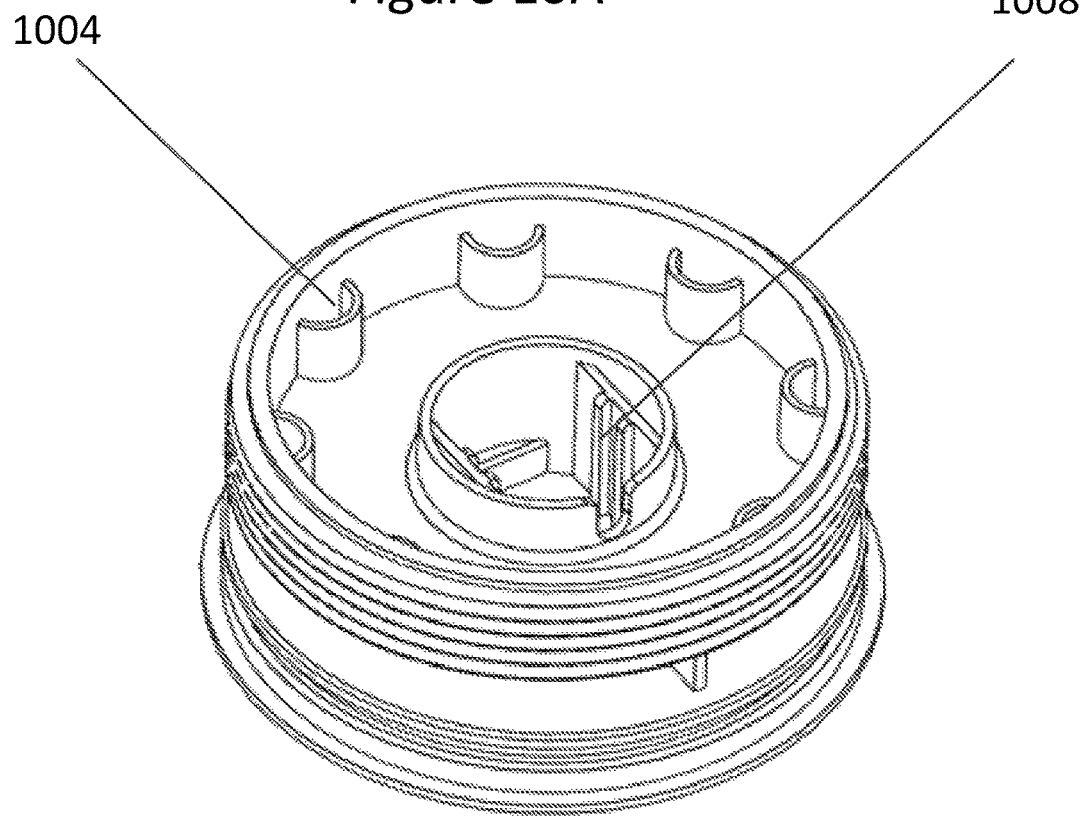
FIG. 10 B shows a top perspective view of an energy-emitting device housing.

FIG. 10A shows a bottom perspective view of an energy-emitting device housing. FIG. 10B shows a top perspective view of the energy-emitting device housing. The generator 228 (not shown) may be fitted into a generator fitting 1008. Such a fitting 1008 can provide stability for the generator 228 to prevent it from translating and/or rotating in certain directions. Moreover, the fitting 1008 can allow the generator to receive angular forces upon it (e.g., from the turbine, etc.) without allowing the generator to be displaced. Flow paths 1004 may be installed in the housing to allow fluid to pass from the turbine chamber out of the nozzle assembly without making fluid contact (e.g., communication) with electrically charged components of the nozzle assembly.

Figure 11:
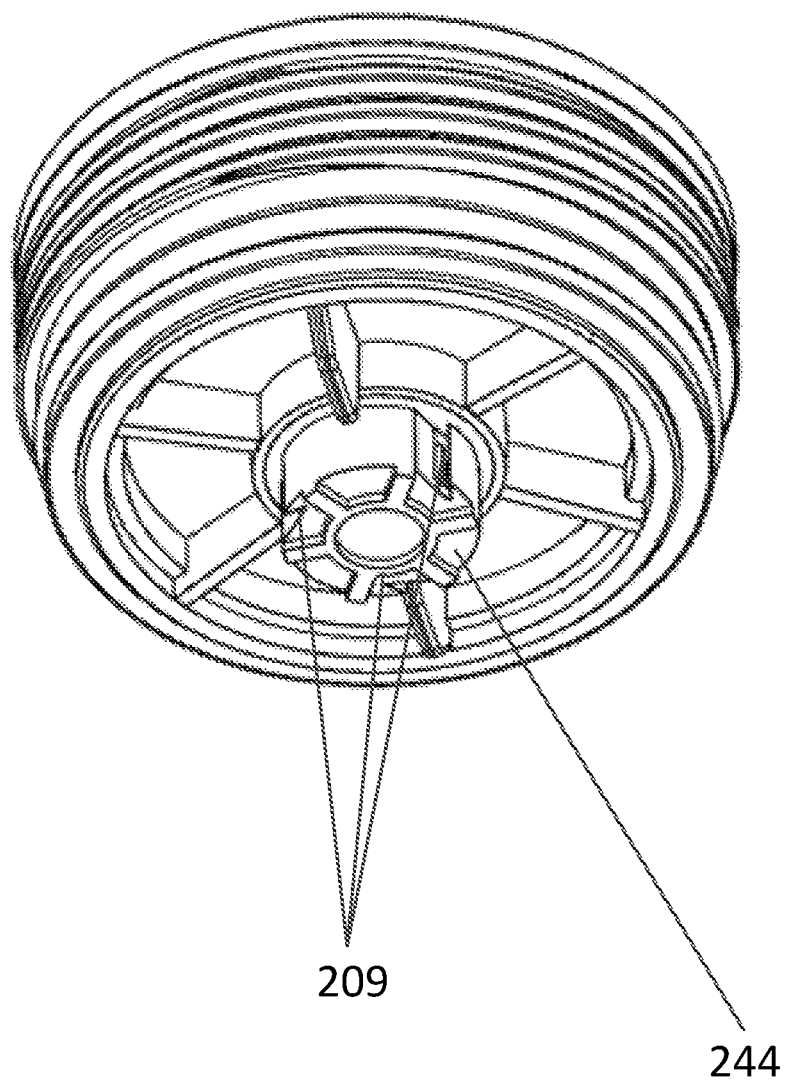
FIG. 11 shows a bottom perspective view of an energy-emitting device housing with attached fluid flow diverter.

FIG. 11 shows a bottom perspective view of an energy-emitting device housing with attached fluid flow diverter 244. As shown, the fluid flow diverter 244 comprises three inlets 209. These inlets 209 allow fluid to travel from a flow source to the energy transformation means (e.g., turbine) (not shown). The flow diverter 244 may be attached mechanical attachments, a snap interface, and/or a screw interface.

Figure 12:
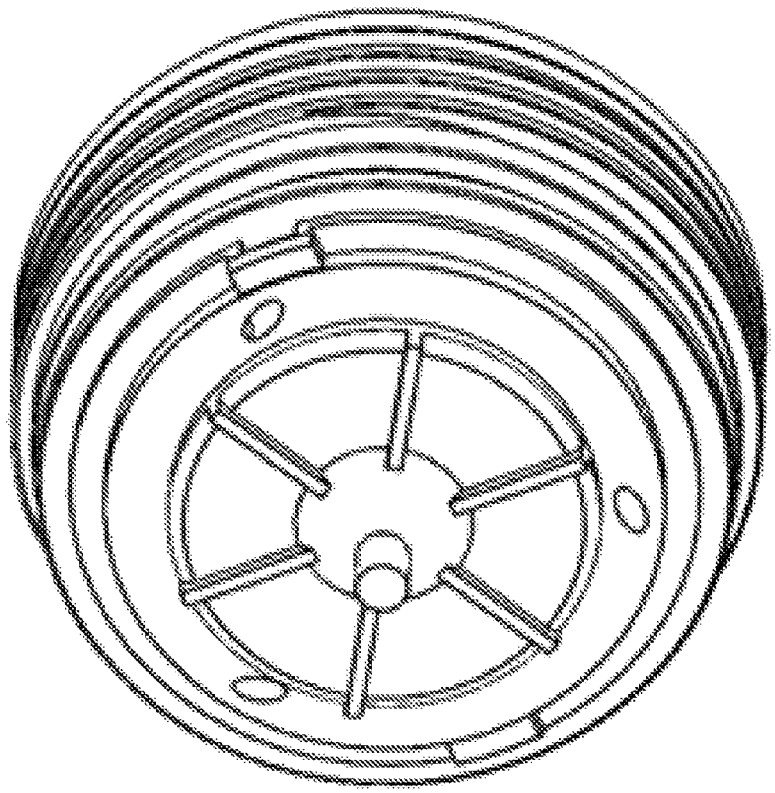
FIG. 12 shows a bottom perspective view of an energized fluid nozzle.

FIG. 12 shows a bottom perspective view of an energized fluid nozzle. As shown, the pressure fluid diverter includes three inlets to allow fluid to enter the nozzle assembly. The inlets may change the direction of the flow of the fluid and/or change the velocity of the fluid flow through the inlets. The fluid diverter may use an internal manifold to redirect the water from a vertical flow pattern to horizontal flow pattern. This may allow the turbine (not shown) to have vertical blades and reduce blow-by from passing water, thereby increasing efficiency for low-flow applications. The fluid diverter may comprise one or more rigid materials, such as, for example, nylon, plastic (e.g., plastic polymer such as PVC), polycarbonate, wood, and/or metal (e.g., aluminum, copper, steel). In some embodiments, a fluid diverter may also be referred to as a fluid flow diverter.

Figure 13:
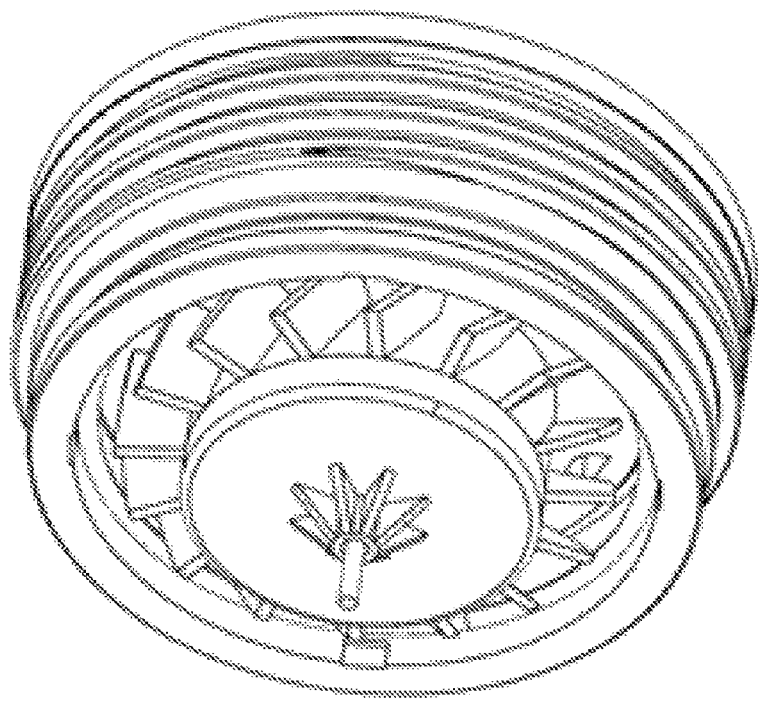
FIG. 13 shows a bottom perspective view of nozzle without the pressure fluid diverter.

FIG. 13 shows a bottom perspective view of nozzle without the pressure fluid diverter. The turbine with the attached blades are illustrated. As shown, the blades have a rectangular interface, and the interface of each blade defines a plane that is transverse to a plane created by the interface of each neighboring blade.

Figure 14A:
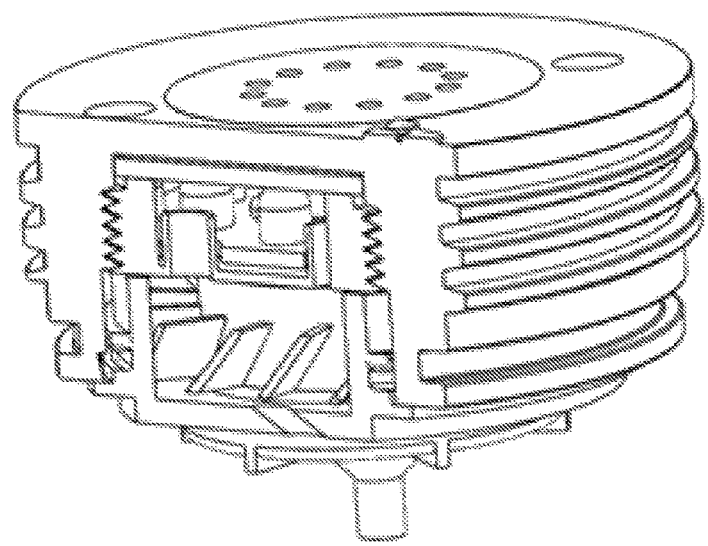
FIGS. 14A-B show various cross sections of fluid nozzle assemblies.
Figure 14B:
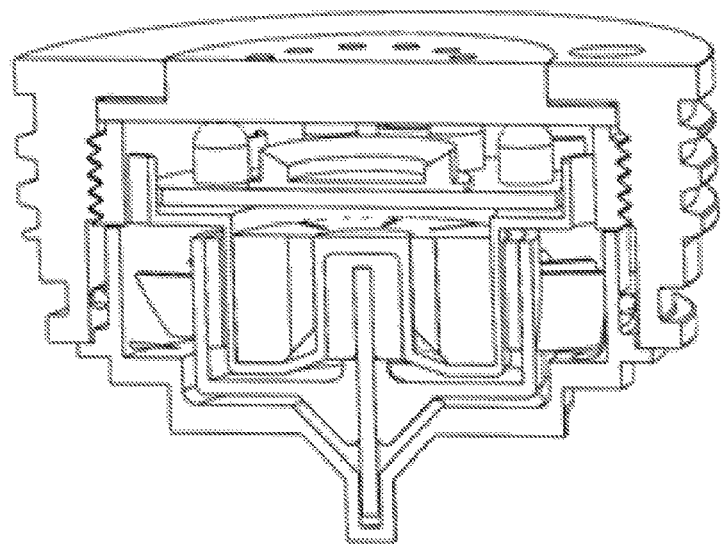

FIGS. 14A and 14B show various cross sections of fluid nozzle assemblies.

Figure 15A:
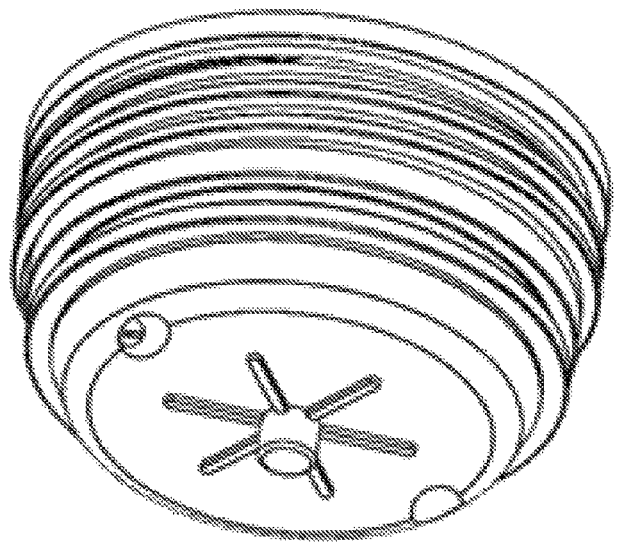
FIG. 15A shows a bottom perspective view of an energized fluid nozzle.

FIG. 15A shows a bottom perspective view of an energized fluid nozzle. As shown, the pressure fluid diverter includes two inlets to allow fluid to enter the nozzle assembly. The inlets may be placed near the edges of the nozzle assembly (e.g., far from a nozzle axis), as shown. In some embodiments, the inlets are placed near the center of assembly (e.g., near to the nozzle axis).

Figure 15B:
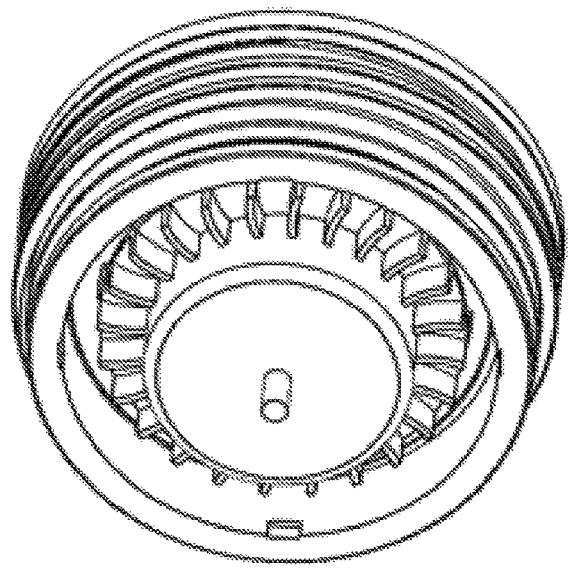
FIG. 15B shows a bottom perspective view of nozzle without the pressure fluid diverter.

FIG. 15B shows a bottom perspective view of nozzle without the pressure fluid diverter. The turbine with the attached blades are illustrated. As shown, the blades have a curved interface (e.g., a C-shape interface). Such a turbine blade shape can increase the interface of the turbine blade with the fluid flow. This may be helpful, for example, where higher electricity generation is required and/or where fluid flow velocity is lower. Moreover, it may reduce fluid blow-by.

Figure 15C:
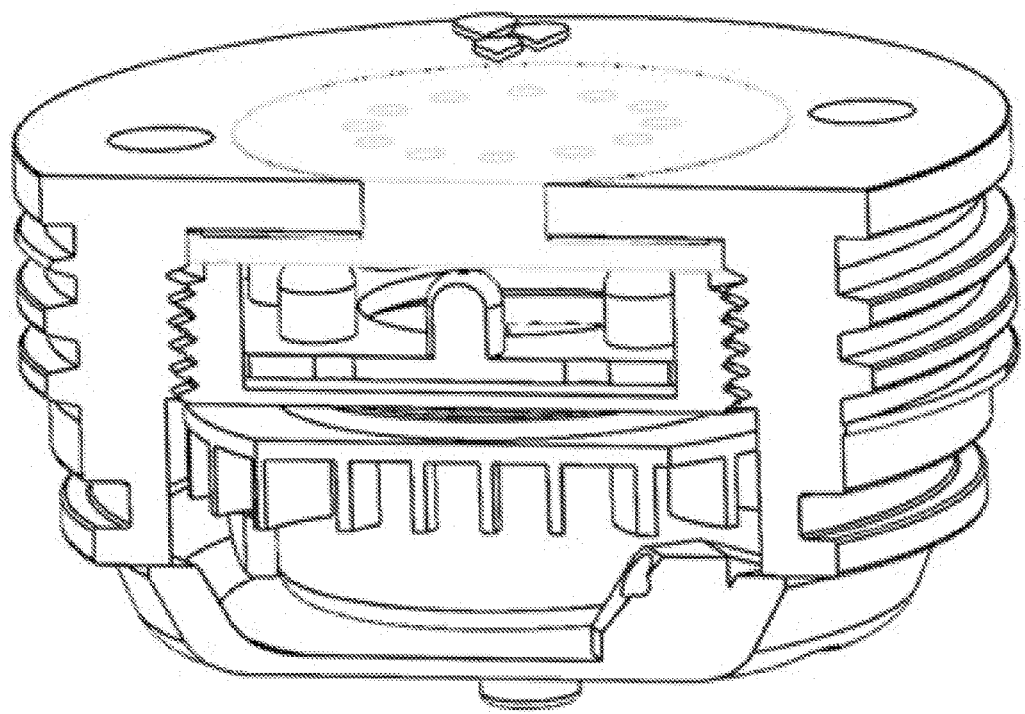
FIG. 15C shows a cross section of a fluid nozzle assembly.

FIG. 15C shows a cross section of a fluid nozzle assembly. As shown, the turbine blades are attached to a plate/board configured to rotate with the turbine blades. As described above, this can increase the strength and life of the turbine blade life. Moreover, it may prevent blow-by of the fluid.

Figure 16A:
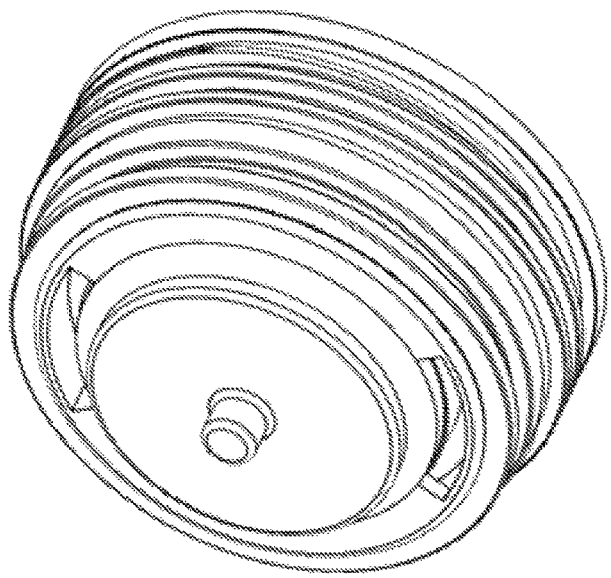
FIG. 16A shows a bottom perspective view of an energized fluid nozzle.

FIG. 16A shows a bottom perspective view of an energized fluid nozzle. As shown, the pressure fluid diverter includes two inlets to allow fluid to enter the nozzle assembly. The inlets may change the direction of the flow of the fluid and/or change the velocity of the fluid flow through the inlets. As shown, the pressure fluid diverter uses an internal manifold to redirect the water from a vertical flow pattern to horizontal flow pattern. This may allow the turbine to have vertical blades and reduce blow-by from passing water, thereby increasing efficiency for low-flow applications.

Figure 16B:
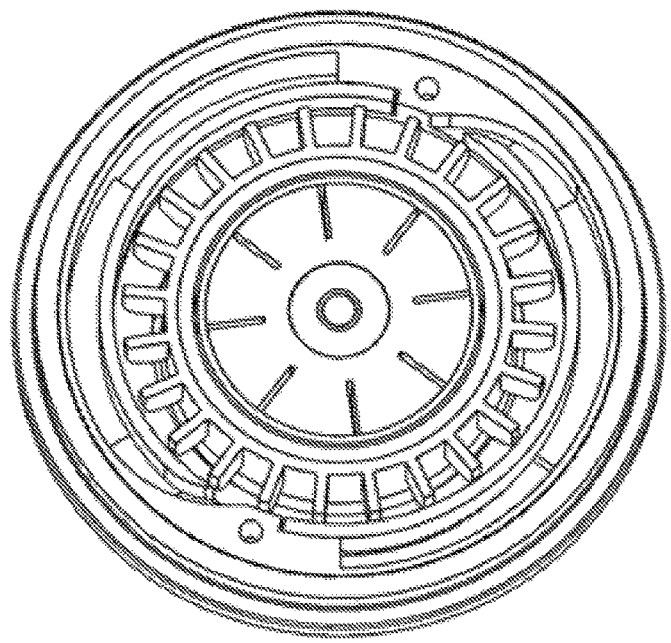
FIG. 16B shows a bottom perspective view of a nozzle without the pressure fluid diverter.

FIG. 16B shows a bottom perspective view of the nozzle of FIG. 16A without the pressure fluid diverter. As shown, the turbine blades are attached to a plate/board configured to rotate with the turbine blades. The internal manifold described above is also displayed.

Figure 16C:
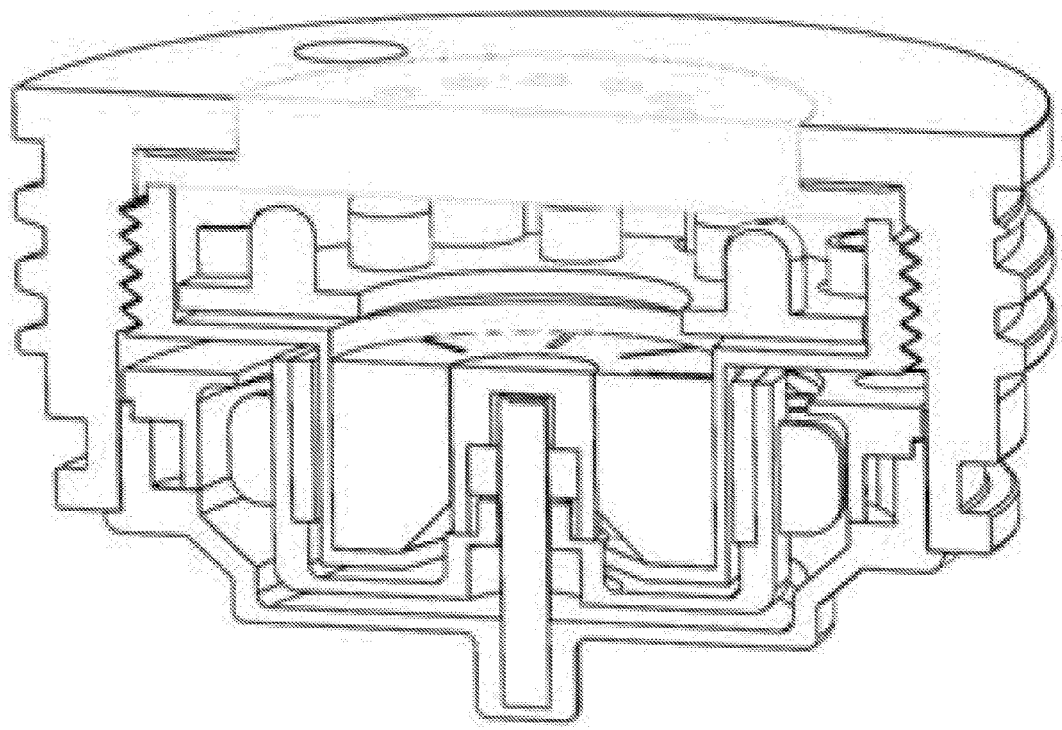
FIG. 16C shows a cross section of fluid nozzle assembly.

FIG. 16C shows a cross section of fluid nozzle assembly. A stator coil, generator, bushing, and other components can be seen.

Modules

The energized nozzles described in detail above include portions that can be provided as interchangeable or otherwise removable and insertable modules. For example, a nozzle can be configured such that an LED insert can be changed and/or a generator insert can be switched out if it breaks, without replacing an entire nozzle. Nozzles themselves can comprise modules, with nozzles of different shapes and/or visual or other sensor effects being adapated for updates and changes of configurations. In this way, a splash pad can be repaired, updated, reconfigured, serviced, or changed. Some modules can remove water functionality to winterize an installation, or address needs for reduced or increased water or electricity usage.

The energized nozzles and other features discussed herein need not be mounted in the ground. They can be inserted into other protruding water features, at the ends of hoses, or in any configuration in a water play area generally. Structures within these nozzles can convert the energy present in fluid flow into the other energy forms described, thereby enhancing a sensory experience and improving play.

The sensory effects of the energized nozzles and other play features described above can be enhanced in various ways. For example, the energized nozzles can mechanically convert energy from water pressure and flow into haptic feedback (e.g., a buzzing or other vibration under the feet of the user), into sound energy that begins, ends, or changes in response to a the water flow and/or in response to pressure from the user. For example, a foot can stand on a nozzle, thereby altering the flow and pressure within or above that nozzle. This in turn can affect the color, sound, or motion of one or more portions of an energized nozzle assembly. The energy emitted from an energized nozzle can also change effects periodically in predictable or random ways. For example, the water flow within the nozzle can displace a non-rigidly attached mechanical component which may rock back and forth or otherwise periodically alter the flow, which in turn may alter the energy conversion and transmission.

In some embodiments, prominent features of a splash pad are the water features. The features can be housings/nozzles inset into the surface material or above grade apparatuses. There can be any number of housings/nozzles within a splash pad with a variety of spray configurations (or shapes). Usually the number of housings is determined by a water distribution valve or manifold used in the complete splash pad. There are multiple options in the market for housings/nozzles.

Figure 17:
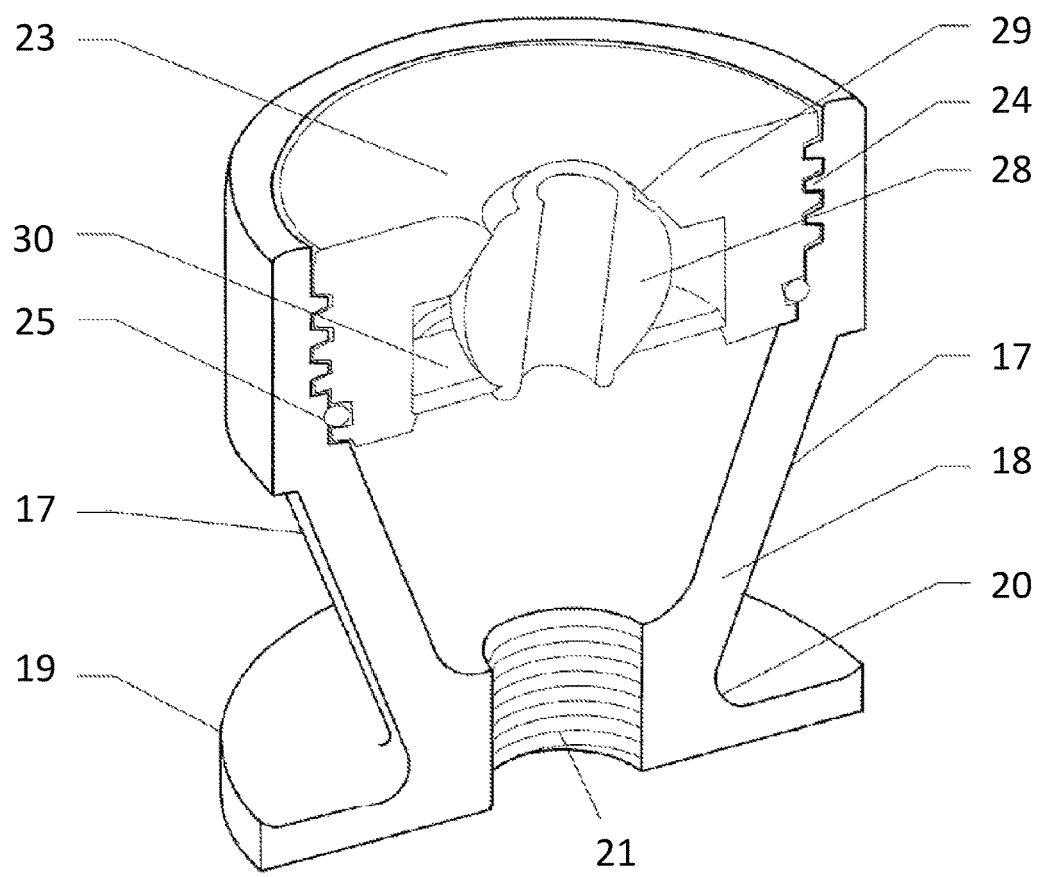
FIG. 17 shows a cross-section of a nozzle with a swivel channel.

Referring to FIG. 17, in some embodiments a tapered shape 17 of the body of the housing 18 can allow for strong adherence in the concrete splash pad. The tapering 17 aspect helps to keep the housing 18 from slipping from its position within the concrete because the housing is essentially anchored in the concrete where the water stop 19 and the base of the tapered section 17 meet 20. The upper ribbed collar also helps the housing resist turning when positioned within the concrete. The water stop lip 19 at the bottom of the housing can help inhibit the passage of water drainage to the compacted base material. The female fitting (threaded or slip-fit) 21 to the housings 18 allows for more convenient plumbing to the system. The rolled or smooth edge 22 on the top of the housing 18 provides a clean or finished presentation of the housing/nozzle 2 when placed in the concrete pad and helps to avoid injuries that may be caused when the edge is unfinished and/or at a sharp angle.

During installation the housing 18 is mounted in a position that relates to the center or specific point on the splash pad. This is done to ensure that when a nozzle 23 is switched out the new nozzle pattern will line up correctly to the center of specified point on the splash pad. To create this unique feature there is a reference point on the housing that relates to where the threads start and end within the housing.

Figure 18:
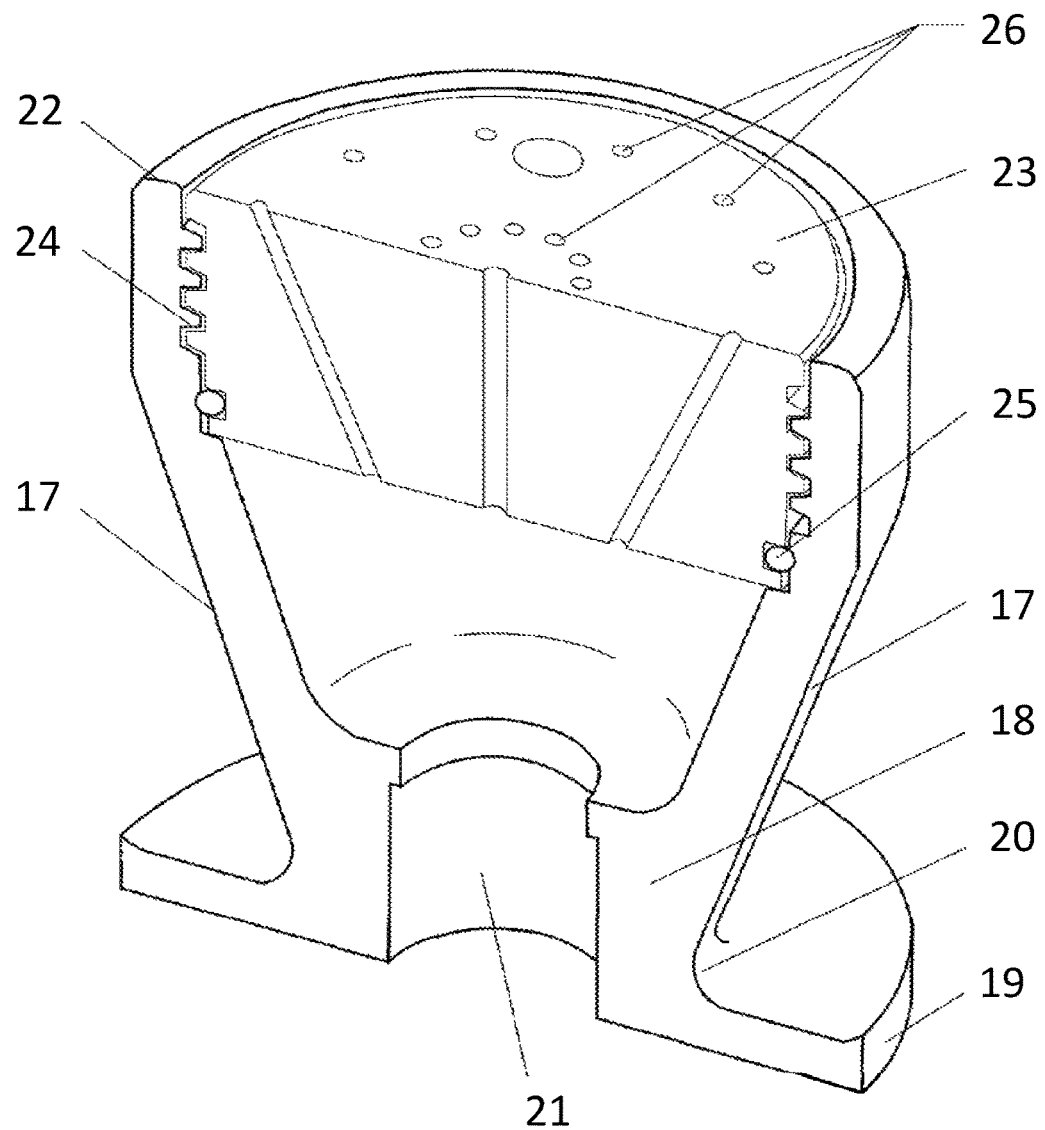
FIG. 18 shows a cross-section of a nozzle with multiple fixed channels that are not parallel.

An embodiment of a nozzle 23 or puck is described below. The nozzle 23 incorporates many design features that provide the end user the ease of installation and option to interchange water features. The nozzle 23 can be attached to the housing 18 via a threading system 24. This threading 24 allows for added strength and water tight seal. To increase the effectiveness of the water tight seal there is an added O-ring seal 25 placed below the threads 24 of the nozzle that comes in contact with the housing 18 when seated to its base threads. The drill patterns in a nozzle affect the shape of the water that sprays from its openings. Each nozzle drill pattern can be oriented in a way that lines up to the center or specified point on the splash pad when the nozzle 23 is seated to the bottom of the threads 24 within the housing 18. A specific orientation of the housing in the splash pad provides that when nozzles 23 are interchanged the spray patterns are oriented to the center or specified point on the splash pad in a particular way. The following are some, but not a thorough list, of water flow designs of the nozzle: straight shot which sprays a single stream of water vertically into the air at multiple desired heights and volumes. Shower shot (see FIG. 18) which sprays from multiple holes 26 within the nozzle that are set at different angles to produce a traditional fountain affect. Fan shot is designed with a thin elongated opening which produces a fan shape to the water. The elongation of the opening determines the width and height at which the water is sprayed. Angle shot which sprays any shape and volume of water at an angle suitable to reach a desired location on a splash pad. Angle shots can be in single shot form or fan shape. The angle shot is usually placed on the outer perimeter of a splash pad and is shot across the diameter of the splash pad. Adjustable shot is a standard nozzle for a splash pad kit because it allows for the placement of the housings to be almost anywhere on the splash pad due to the fact that the ball swivel 28 can be manipulated to a desired angle. It also allows for corrections to be made to offset any placement problems when the housing 18 is not level to the surface of the splash pad. The adjustable shot includes components that allow for adjustment incorporated into the nozzle itself.

In some embodiments, there are three components of the ball swivel adjustable shot that produce the adjustability of this nozzle—the adjustable nozzle 29, the ball swivel (or swivel channel) 28 and the ball swivel washer 30 which holds the ball swivel 28 to adjustable nozzle 29. The bubbler shot is designed to allow a larger volume of water to be expelled from the housing. The bubbler nozzle is usually designed to shoot vertically but with a smaller height than what a single shot nozzle can produce due to the larger nozzle opening. The bubbler nozzle can be feed directly from the pump and filter or given a dedicated line from the water distribution valve, not split in two like the usual housing/nozzle. Nozzles in design are the following: Spinner shot which sprays a rotating stream of water in a circular pattern into the air by forcing water across a horizontal flush mounted propeller piece mounted on the top of the nozzle. The zigzag shot is similar in design to the ball swivel adjustable shot but can be different in that the compression of the ball swivel washer is less to allow for a free pattern of spray from the ball swivel. The adjustable pin on the tool is not used on the zigzag shot. The tree shot is similar in water pattern (height and volume) as the single shot with a single shot in the middle and two angled holes offsetting the middle shot to its sides. The housings and the nozzles can be manufactured in many sizes to allow other features to be attached to the housing 18 via a threaded fitting 24, of similar nature to the nozzles 23, on the bottom of any above surface feature.

In some embodiments, an installation tool is used to turn-in and turn-out the nozzles from the housing. The tool can be designed with multiple pins (e.g., spanners) that are inserted into the top of the nozzles that allow for the turning of the puck. The tool also is designed with other features that allow for adjustability of specific features within unique nozzles. One example of the adjustability portion of the tool is when an adjustment needs to be made to the adjustable nozzle. The single pin on the tool is inserted into the spout of the ball swivel adjustable shot and then manipulated to the desired angle at which the water will shoot. The tool is manufactured in a variety of materials such as plastic and metal in various embodiments for acceptable rigidity, manufacturability, durability, and ease of use.

The above description is merely illustrative. Having thus described several aspects of at least one embodiment of this invention including the preferred embodiments, it is to be appreciated that various alterations, modifications, and improvements will readily occur to those skilled in the art. Such alterations, modifications, and improvements are intended to be part of this disclosure, and are intended to be within the spirit and scope of the invention. Accordingly, the foregoing description and drawings are by way of example only.

What is claimed is:

1. A system configured for energizing a water splash pad area, the system comprising:
   a below-ground water source comprising a water pipe;
   a splash pad at ground surface;
   a nozzle assembly removably held in the splash pad fluidly connecting the splash pad area and the water source, the nozzle assembly comprising:
      a fluid flow path comprising:
         an inlet opening configured to accept water flow from the below-ground water source;
         a fluid-tight seal between the water pipe and the inlet opening;
         a flow chamber configured to create flow having a direction of rotation, the direction of rotation transverse to a generating axis of the flow chamber; and
         an outlet opening configured to accept fluid flowing out of the flow chamber and in fluid communication with the splash pad area, the outlet opening configured to forcefully transmit water into the splash pad area above the water source;
      a set of energized chambers comprising:
         a generating chamber configured to support a generator comprising at least a magnet and electrical coil that move with respect to each other under the influence of a mechanical rotor attached to an axle, the axle configured to protrude into the flow chamber along the generating axis and rigidly connect to at least two driving surfaces such that the flow in the flow chamber pushes against the driving surfaces, thereby rotating the axle in the direction of rotation; and
         an energy emitting chamber configured to accept electricity generated in the generating chamber, transform that energy into at least light energy, and transmit that light energy into the splash pad area, the energy emitting chamber configured and positioned with respect to the outlet opening such that the light energy illuminates the water flowing out through the outlet opening of the fluid flow path;
      a sealing device that is configured to prevent electrical current in the set of energized chambers from flowing into the water present in the fluid flow path; and
      a modular interface configured to allow removal and replacement of at least one of the outlet opening, the nozzle assembly, the energy emitting chamber, or the generator.

2. The system of claim 1, wherein the below-ground water source feeds water into nozzle assembly, the nozzle assembly positioned above-ground for transmission of water outward or downward to the splash pad area.

3. The system of claim 1, wherein the below-ground water source feeds water into the nozzle assembly, wherein the nozzle assembly is positioned in the ground or at ground level such that the nozzle assembly is configured to transmit water flow upward or above the ground.

4. The system of claim 1, further comprising a pool positioned to receive water from at least one nozzle assembly.

5. The system of claim 1, further comprising an LED assembly configured to be supported and positioned by the energy emitting chamber and electrically connect to the generator, the LED assembly comprising at least eight individual light emitting diodes.

6. The system of claim 5, wherein the sealing device comprises a fluid-tight coating on at least one of the energy emitting chamber, the LED assembly, and the generator.

7. The system of claim 6, wherein the axle comprises a generally cylindrical structure supporting at least 6 angled fins, the fins comprising the driving surfaces.

8. The system of claim 7, wherein the flow chamber is further configured to focus water flow and increase flow velocity through three narrowing passages that direct flow against the driving surfaces from evenly spaced intervals around the exterior of the flow chamber.

9. The system of claim 8, further comprising a partially-transparent plate containing multiple holes that comprise the outlet opening, the plate positioned directly above the LED assembly.

10. The system of claim 9, wherein the plate is mounted to be flush with the splash pad surface and a surface of the nozzle assembly thereby minimizing hard protrusions into the splash pad area from the splash pad surface while allowing water and light to prominently project from the surface.

11. A nozzle assembly configured to be installed in a residential splash pad, the nozzle assembly comprising:
 a housing defining a housing opening, wherein the housing opening defines a nozzle axis, the housing disposed at an interface of the residential splash pad;
 a circular nozzle plate comprising polycarbonate configured to fit within the housing opening, the nozzle plate having a transmittance of greater than about 0.30, wherein the nozzle plate comprises a surface that is transverse to the nozzle axis;
 one or more channels configured to direct the flow of the fluid out of the nozzle assembly and into the residential splash pad, at least one of the one or more channels being parallel to the nozzle axis;
 a panel comprising three or more LEDs, wherein the LEDs are arranged in a spaced formation on the panel and wherein the LEDs are configured to produce two or more colors of light and configured to emit the light into the residential splash pad;
 a generator having a generator axis;
 a turbine connected to the generator and configured to rotate about the generator axis;
 a flow-diverting mechanism configured to direct the flow of the fluid to the turbine.

12. A nozzle assembly configured to be installed in a residential splash pad, the nozzle assembly comprising:
 a housing disposed at an interface of the residential splash pad;
 one or more channels configured to direct a flow of a fluid out of the nozzle assembly and into the residential splash pad;
 an energy-emitting fixture disposed within the housing configured to emit energy into the residential splash pad;
 a generator having a generator axis;
 a turbine connected to the generator and configured to rotate about the generator axis
 a flow-diverting mechanism configured to direct the flow of the fluid to the turbine and increase the velocity of the flow of the fluid at a turbine interface.

13. The nozzle assembly of claim 12, wherein the housing defines a housing opening, and wherein the nozzle assembly further comprises a nozzle plate configured to fit within the housing opening.

14. The nozzle assembly of claim 13, wherein the nozzle plate is round.

15. The nozzle assembly of claim 13, wherein the nozzle plate comprises polycarbonate.

16. The nozzle assembly of claim 13, wherein the nozzle plate comprises a surface that is transverse to the nozzle axis.

17. The nozzle assembly of claim 13, wherein the nozzle plate has a transmittance of greater than about 0.30.

18. The nozzle assembly of claim 12, wherein at least one of the one or more channels comprises a fixed channel.

19. The nozzle assembly of claim 12, wherein the energy-emitting fixture comprises one or more LEDs.

20. The nozzle assembly of claim 19, wherein the one or more LEDs are configured to produce two or more colors of light.

21. The nozzle assembly of claim 19, wherein energy-emitting fixture comprises three or more LEDs arranged in a spaced formation on the panel.

22. The nozzle assembly of claim 21, wherein the spaced formation on the panel comprises a circular formation.

23. The nozzle assembly of claim 12, wherein the energy-emitting fixture comprises a speaker.

24. The nozzle assembly of claim 12, wherein the energy-emitting fixture comprises a heating element.

25. The nozzle assembly of claim 12, wherein the pressure-diverting mechanism is configured to direct the flow of the fluid at an angle tangent to the turbine at the turbine interface.

26. The nozzle assembly of claim 12, wherein the generator axis is parallel to the nozzle axis.

27. The nozzle assembly of claim 12, wherein the generator axis is at an angle between about 10 degrees and 90 degrees from the nozzle axis.

28. The nozzle assembly of claim 12, wherein the nozzle assembly comprises a swivel channel configured to be able to direct a flow of a fluid in a plurality of directions.

* * * * *